(12) United States Patent
Hirose

(10) Patent No.: US 9,459,431 B2
(45) Date of Patent: Oct. 4, 2016

(54) WIDE ANGLE LENS, IMAGING OPTICAL DEVICE AND DIGITAL EQUIPMENT

(75) Inventor: Masatoshi Hirose, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 638 days.

(21) Appl. No.: 13/976,788

(22) PCT Filed: Dec. 16, 2011

(86) PCT No.: PCT/JP2011/079173
§ 371 (c)(1),
(2), (4) Date: Jun. 27, 2013

(87) PCT Pub. No.: WO2012/090729
PCT Pub. Date: Jul. 5, 2012

(65) Prior Publication Data
US 2013/0278714 A1    Oct. 24, 2013

(30) Foreign Application Priority Data
Dec. 28, 2010    (JP) ................................. 2010-291657

(51) Int. Cl.
G02B 9/12    (2006.01)
G02B 13/18    (2006.01)
G02B 13/04    (2006.01)
G02B 13/00    (2006.01)
G02B 13/06    (2006.01)

(52) U.S. Cl.
CPC ........... *G02B 13/04* (2013.01); *G02B 13/0035* (2013.01); *G02B 13/06* (2013.01); *G02B 13/18* (2013.01)

(58) Field of Classification Search
CPC ............ G02B 13/0035; G02B 13/004; G02B 13/0045
USPC .................................................. 359/713–716
See application file for complete search history.

(56) References Cited

U.S. PATENT DOCUMENTS

| 5,768,030 A | 6/1998 | Estelle et al. | |
| 2004/0246598 A1* | 12/2004 | Amanai | G02B 13/0035 359/784 |
| 2005/0007481 A1* | 1/2005 | Yamaguchi | G02B 9/12 348/335 |

FOREIGN PATENT DOCUMENTS

| JP | 10-111449 | 4/1998 |
| JP | 10-170819 | 6/1998 |
| JP | 2001-272598 | 10/2001 |
| JP | 2004-104259 | 4/2004 |
| JP | 2005-115309 | 4/2005 |
| JP | 2005-316208 | 11/2005 |
| JP | 2008-159823 | 7/2008 |

* cited by examiner

*Primary Examiner* — Scott J Sugarman
(74) *Attorney, Agent, or Firm* — Cozen O'Connor

(57) ABSTRACT

A wide angle lens, which forms an image on an image pickup device having a curved imaging surface, has a whole angle of view of 120° or more and comprises a first lens, a second lens and a third lens in this order from an object side. The first lens is a meniscus lens having a convex surface facing the object side, the second lens has a positive power and the third lens has a concave surface facing an image side. The first, the second and the third lenses respectively have at least one aspherical surface.

8 Claims, 16 Drawing Sheets

EX1

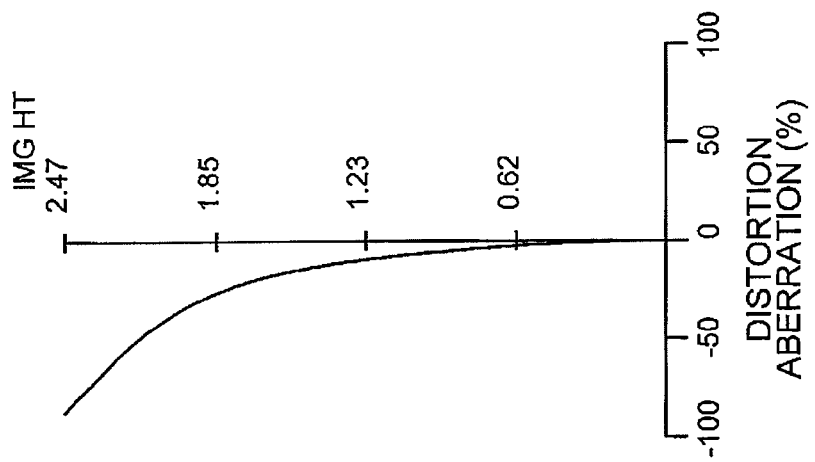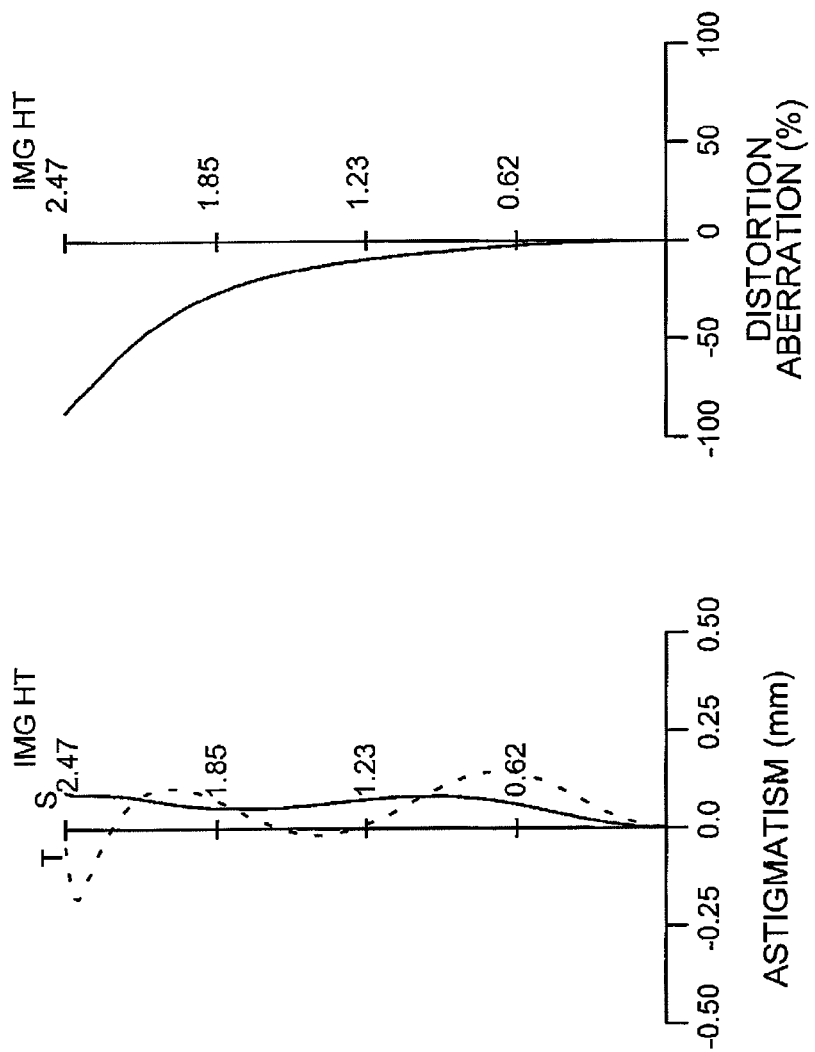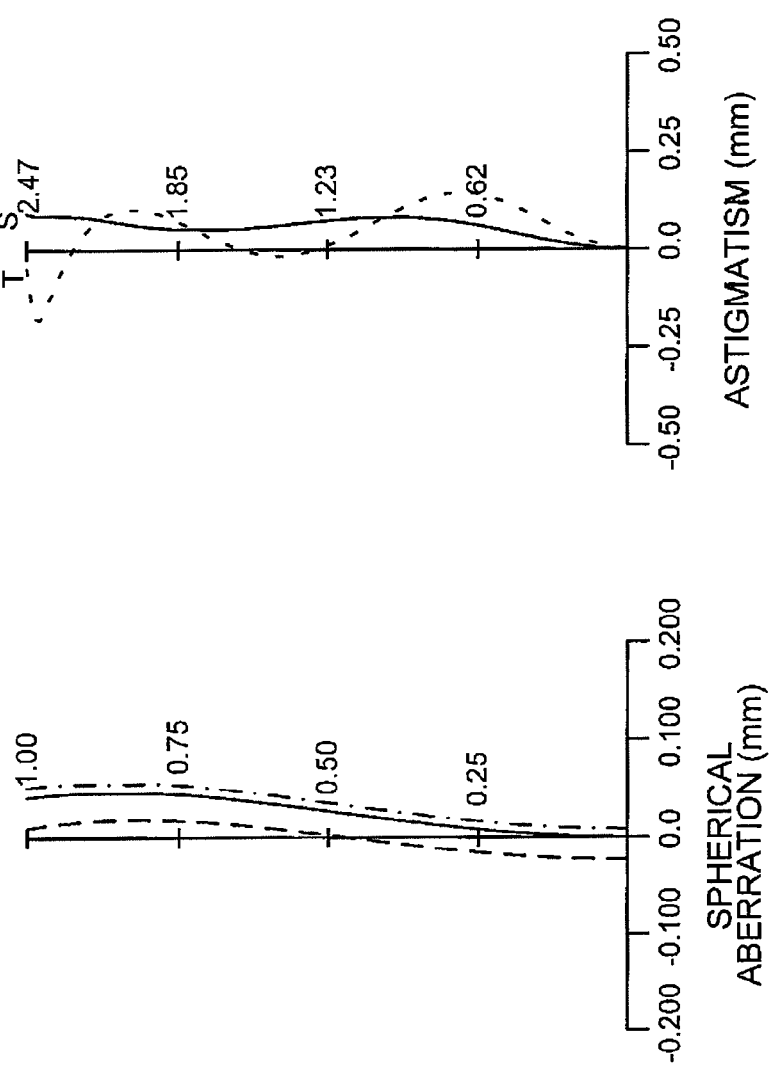

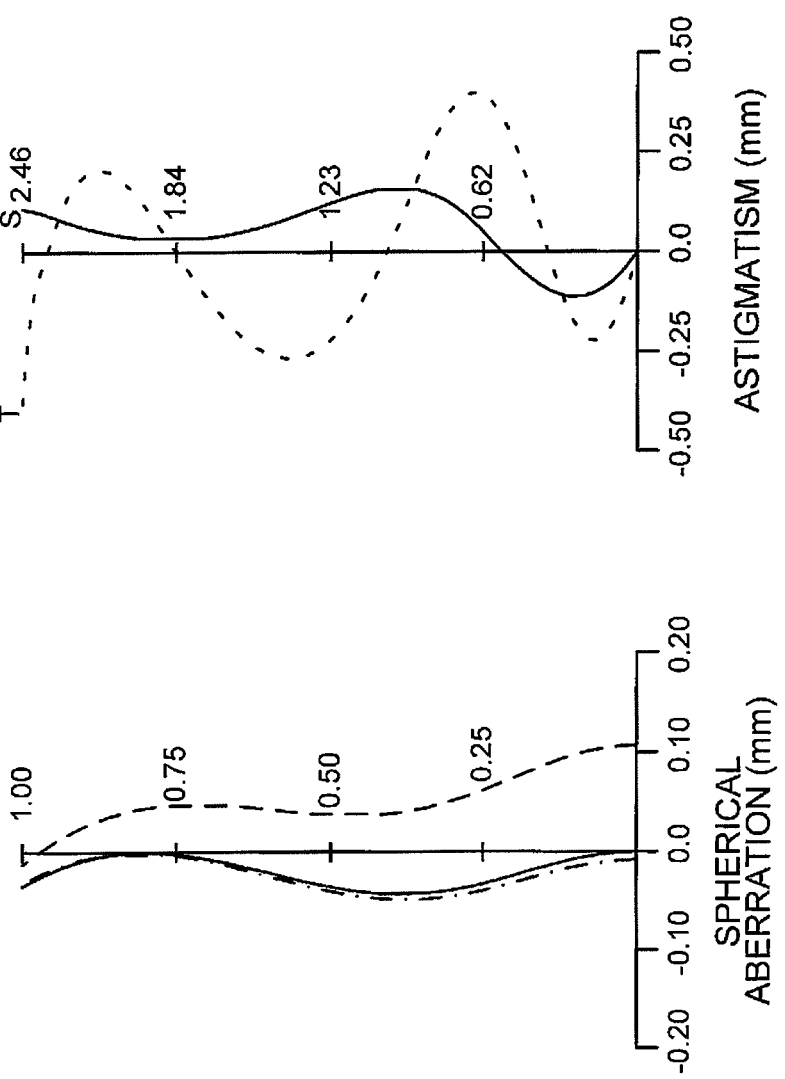
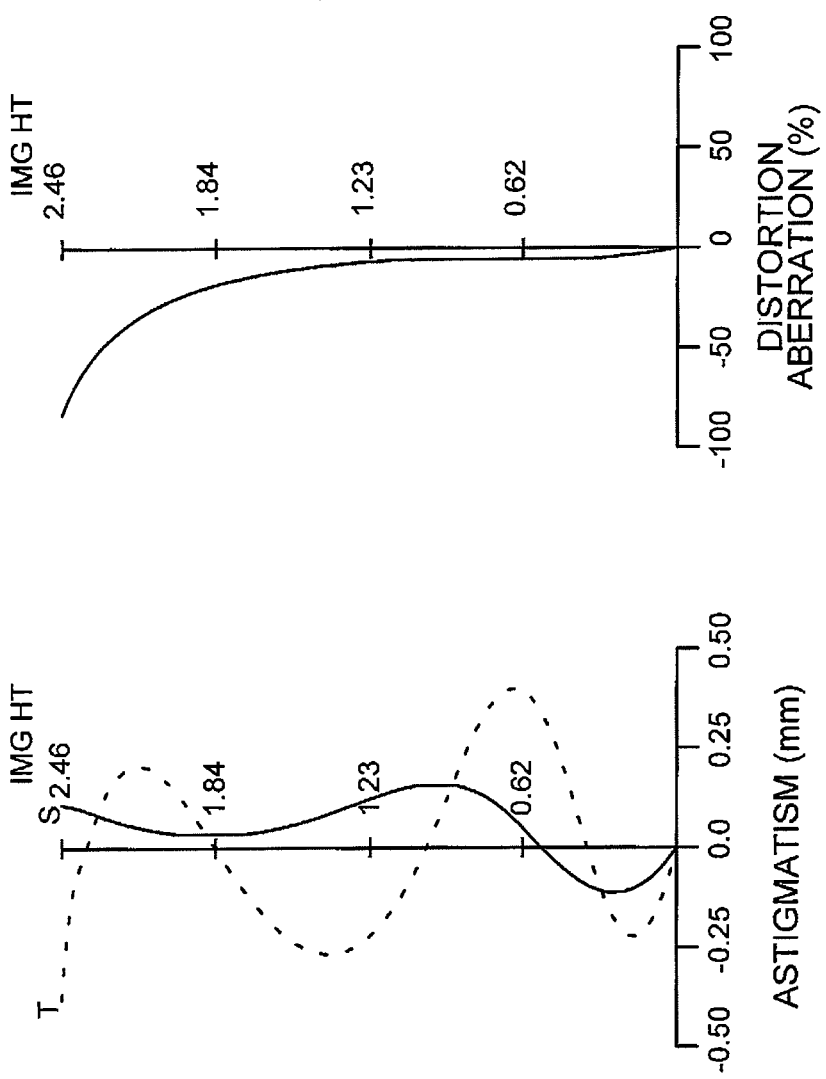
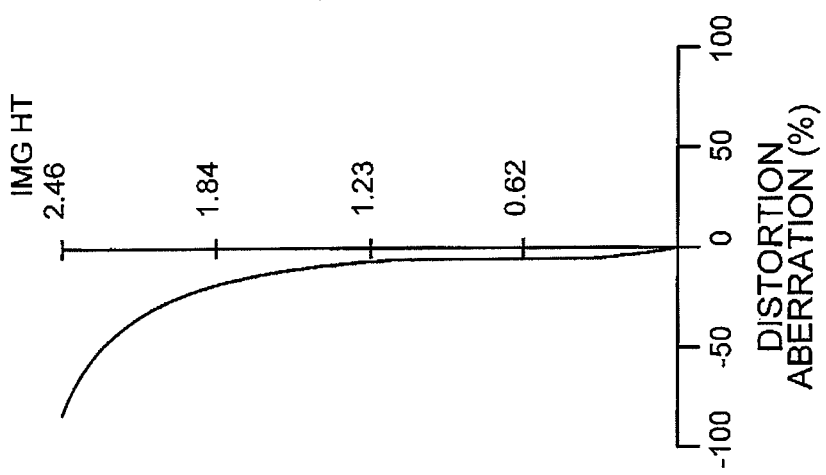

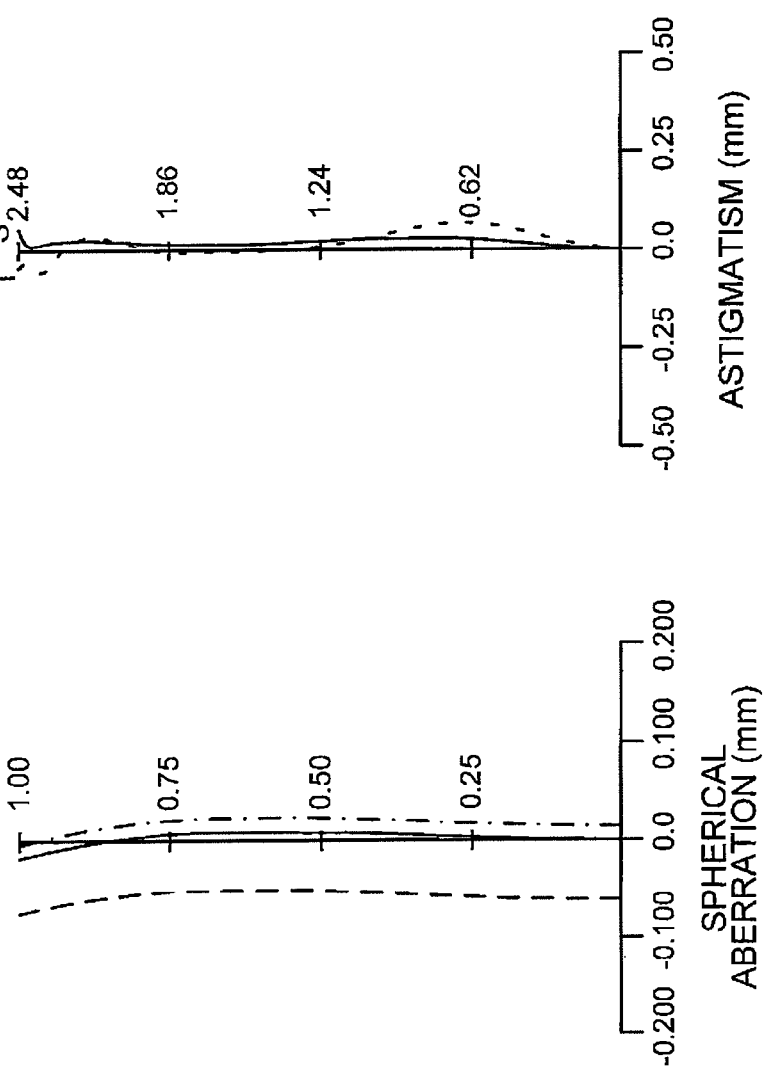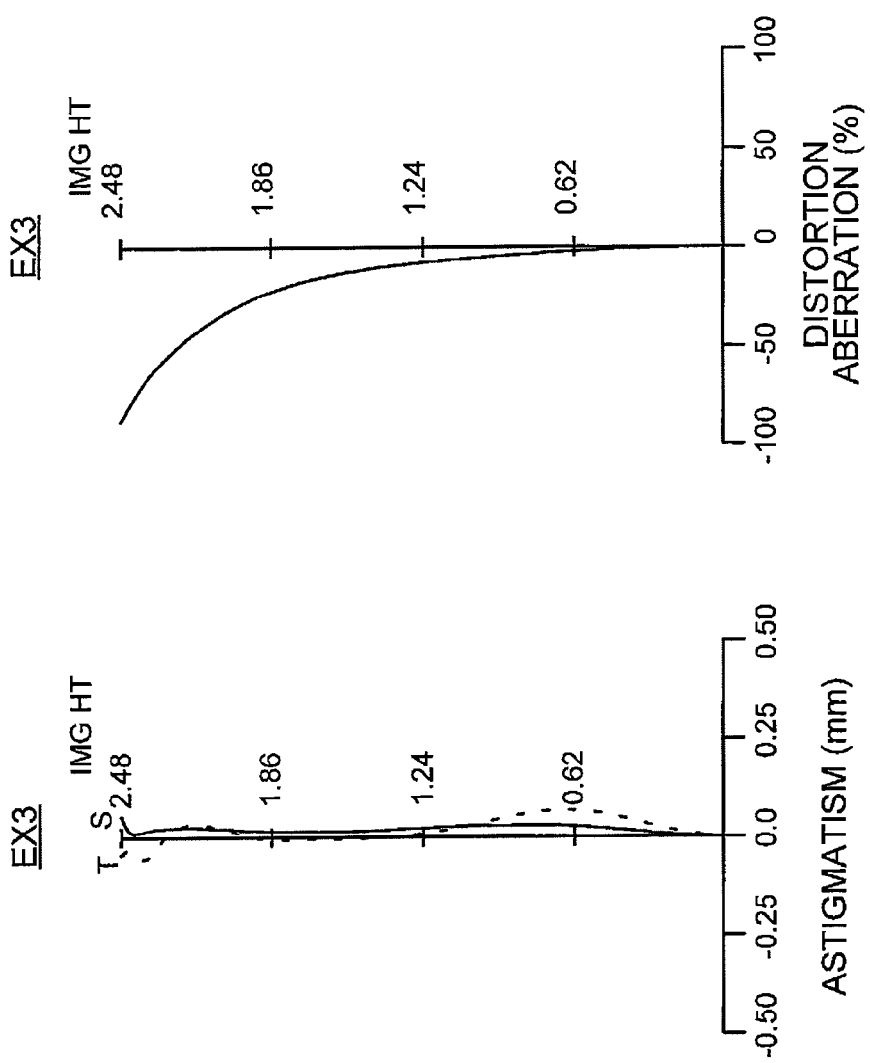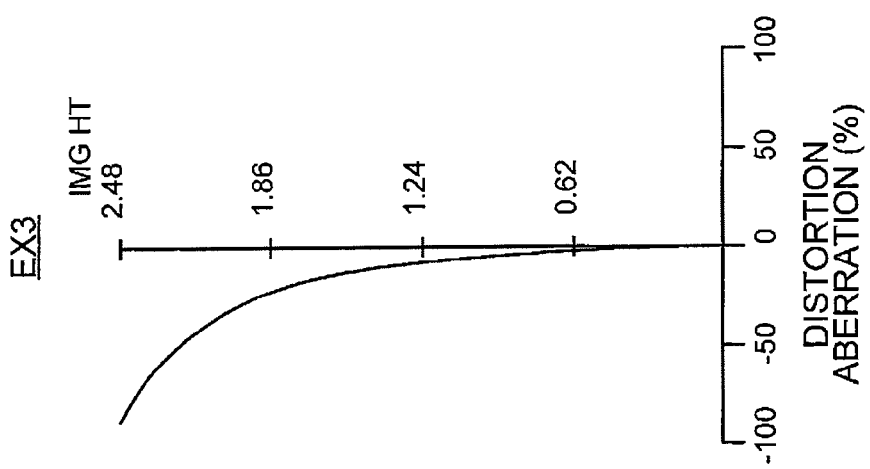

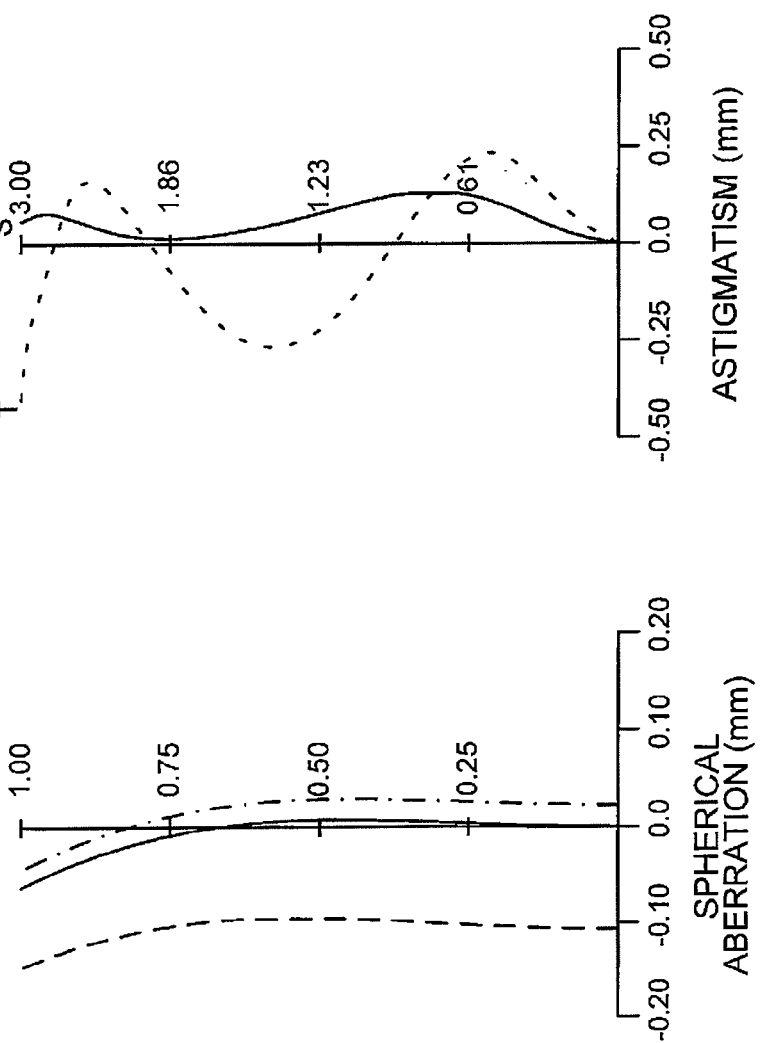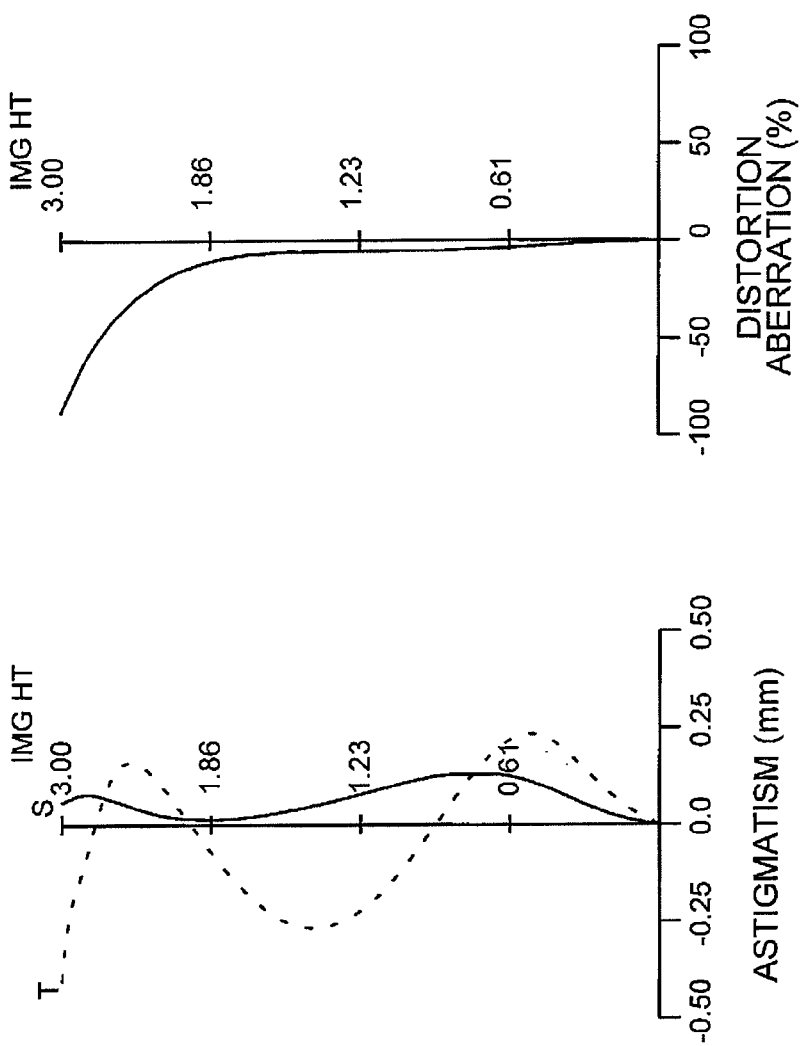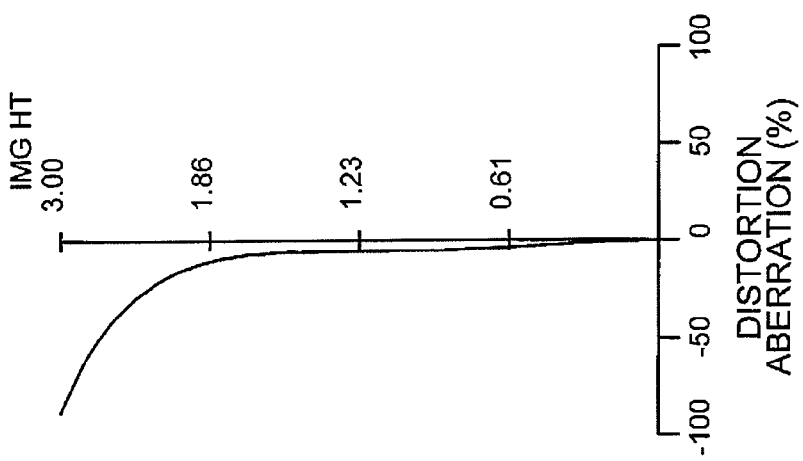

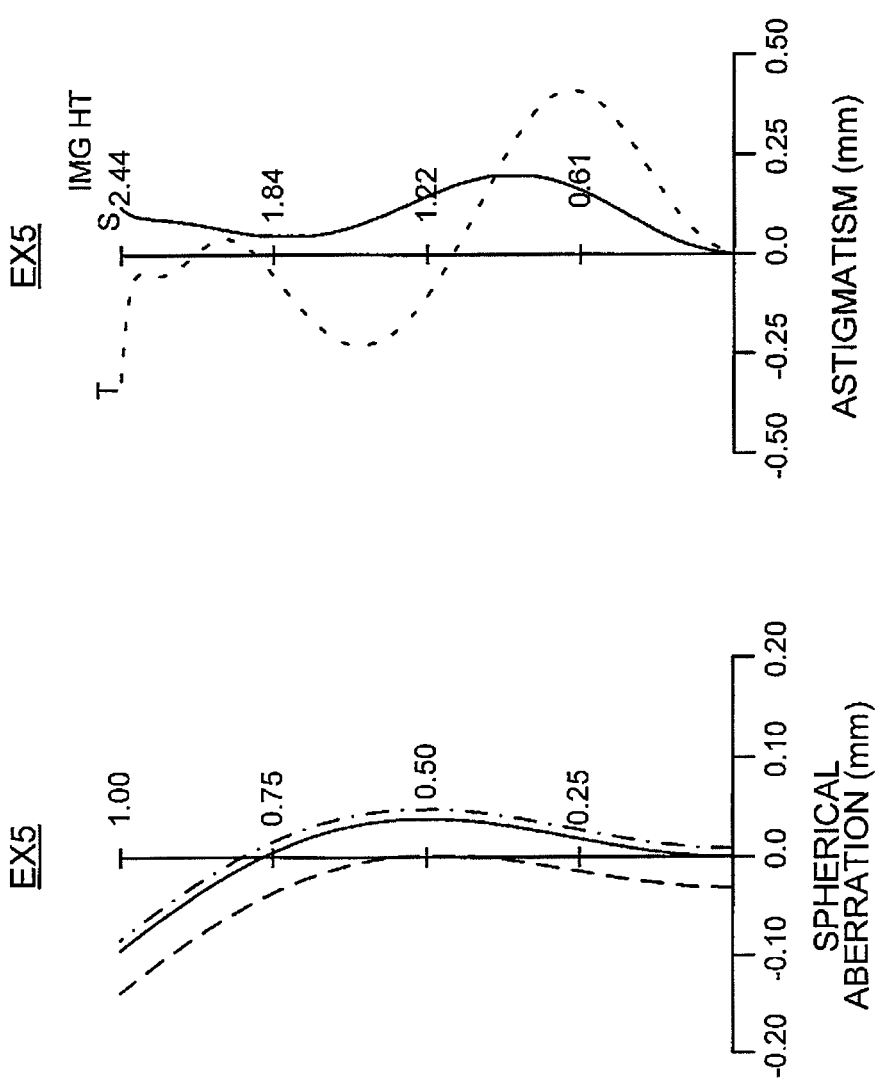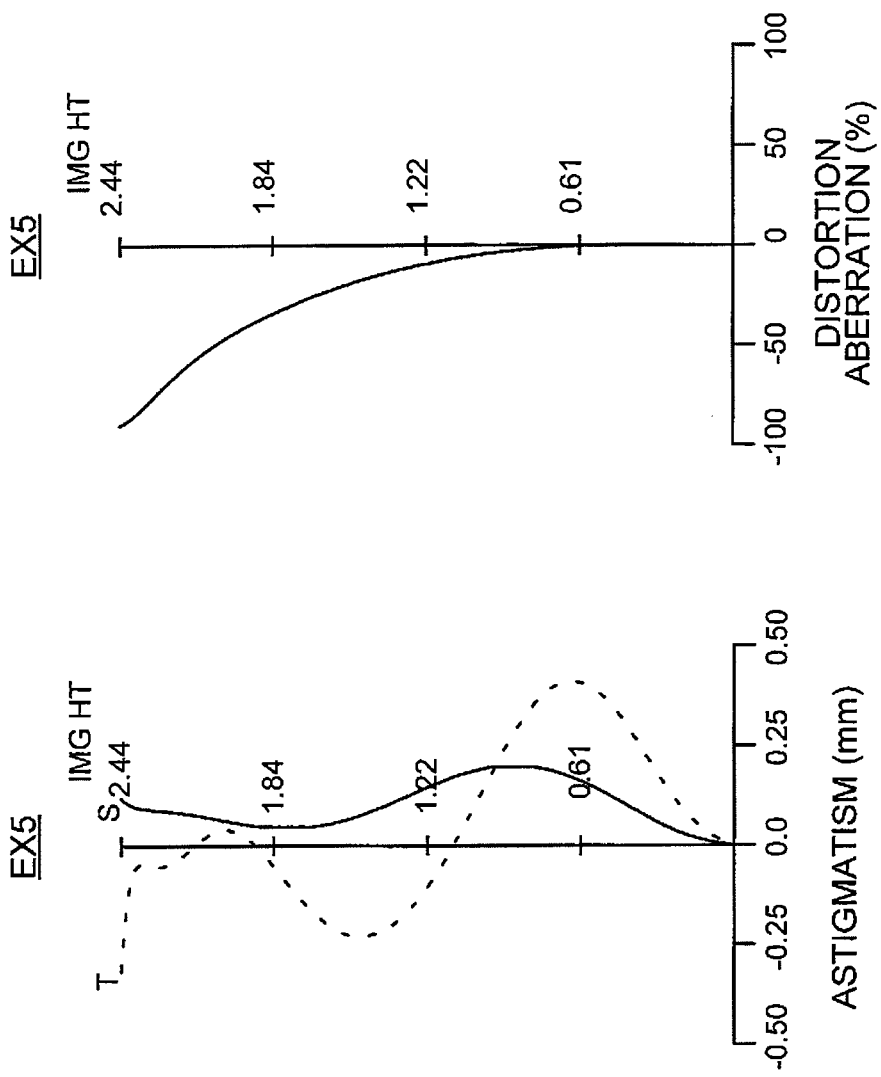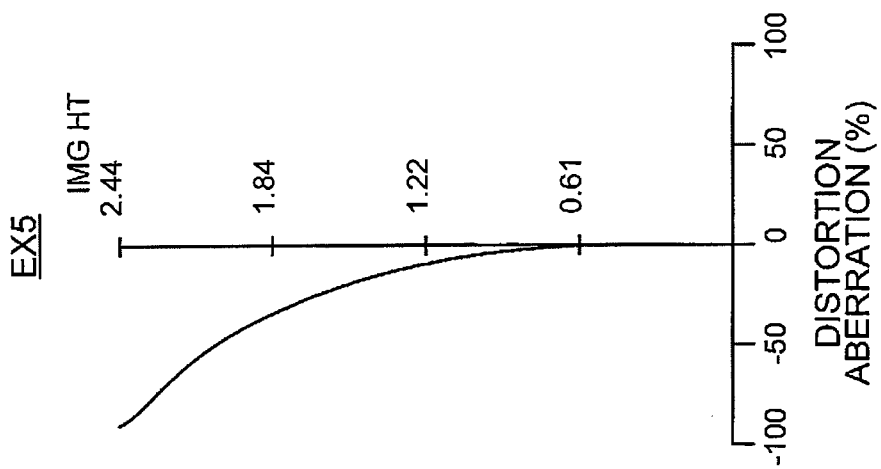

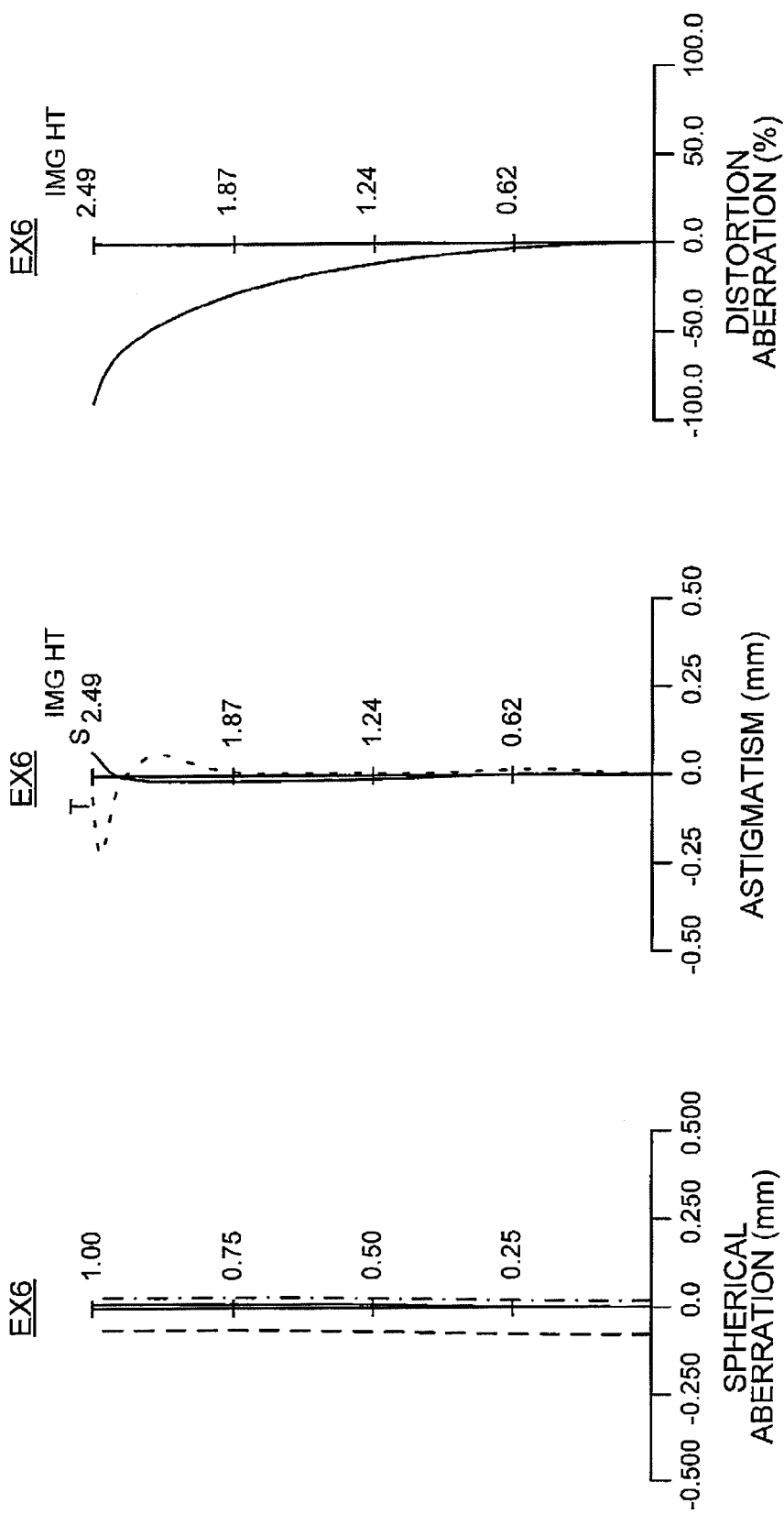

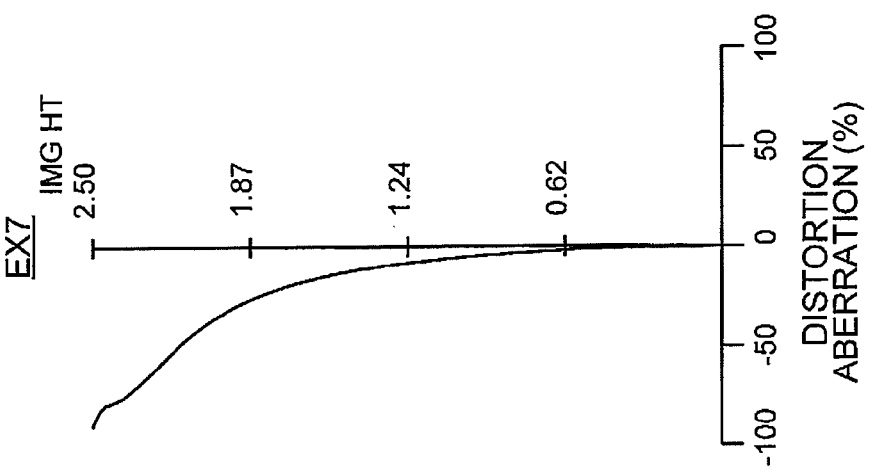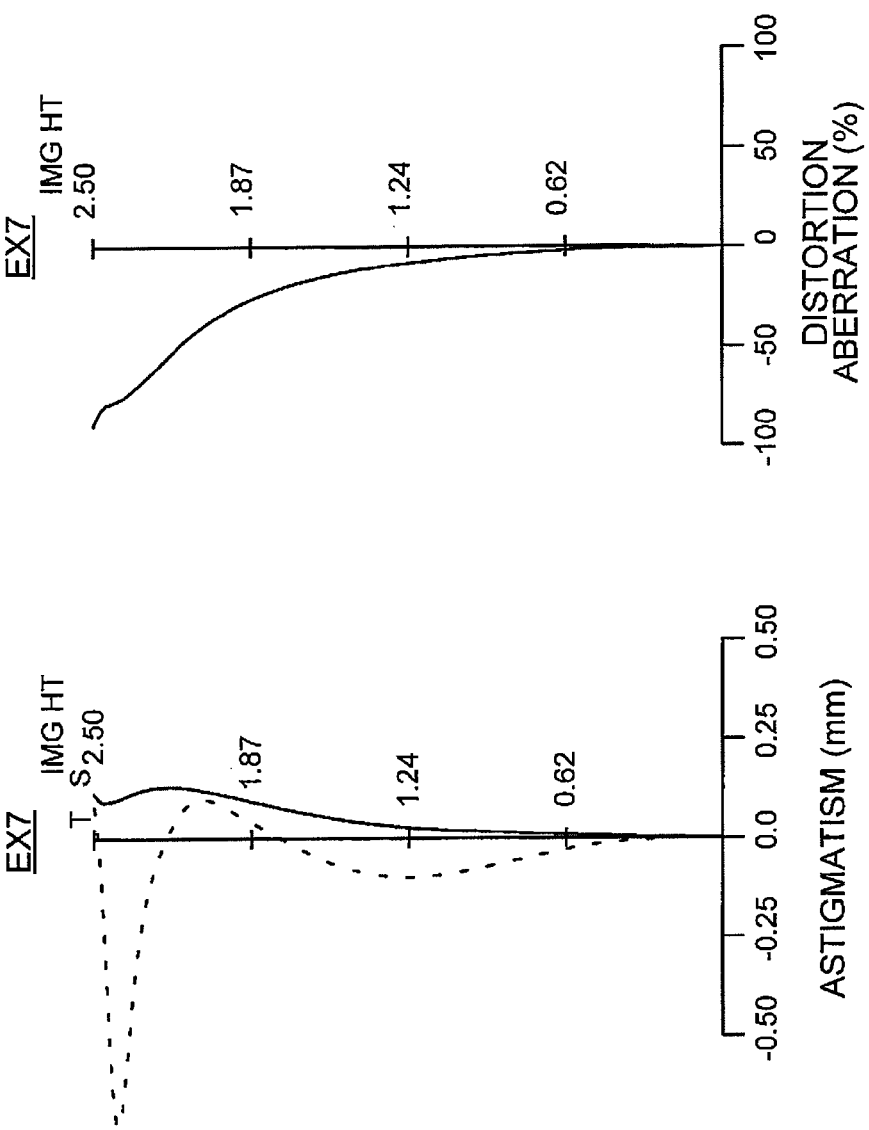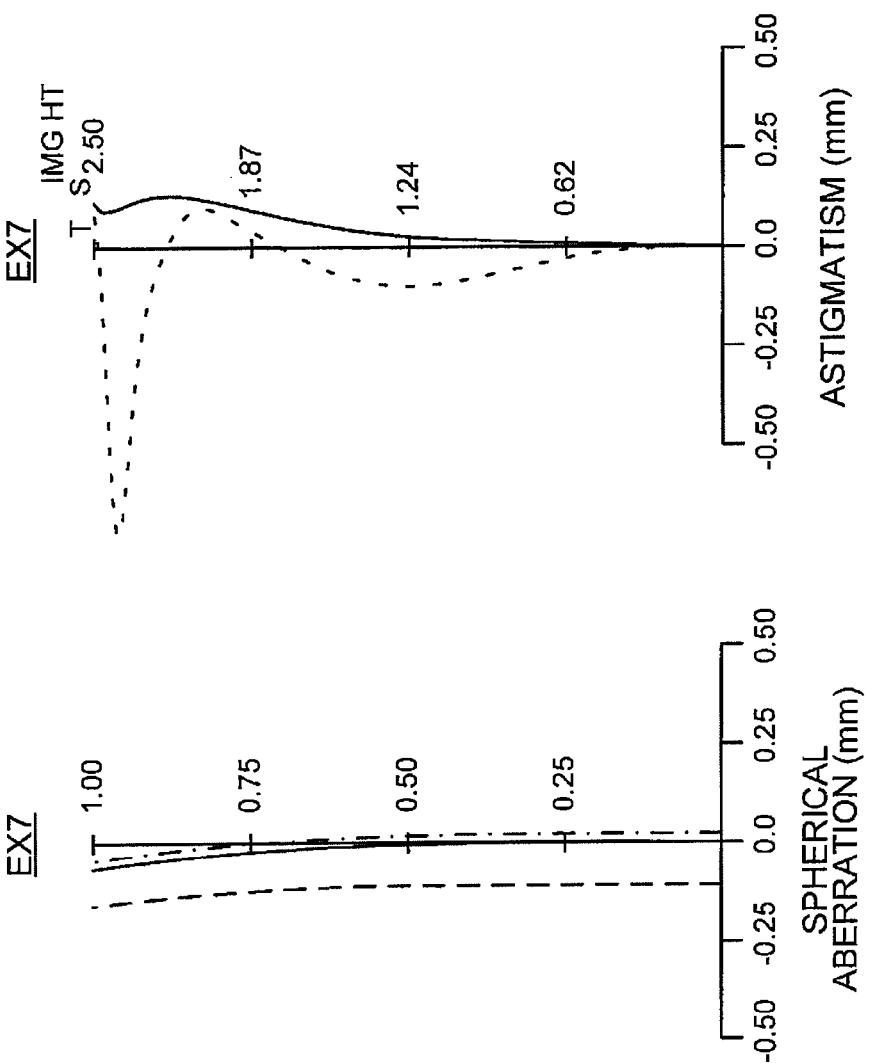

WIDE ANGLE LENS, IMAGING OPTICAL DEVICE AND DIGITAL EQUIPMENT

RELATED APPLICATIONS

This is a U.S. national stage of International application No. PCT/JP2011/079173 filed on Dec. 16, 2011.

This patent application claims the priority of Japanese application no. 2010-291657 filed Dec. 28, 2010, the disclosure content of which is hereby incorporated by reference.

TECHNICAL FIELD

The present invention relates to a wide angle lens system, an imaging optical device, and a digital apparatus. For example, the invention relates to a compact wide angle lens system that is used as an interchangeable lens for a digital camera and forms an optical image of a subject on a curved imaging surface (namely, a light receiving surface) of an image pickup device (for example, a solid-state image pickup device such as a CCD (charge coupled device) type image sensor or a CMOS (complementary metal-oxide semiconductor) type image sensor), an imaging optical device that captures video of a subject by using the wide angle lens system and the image pickup device and outputs the video in the form of an electric signal, and a digital apparatus with an image input function incorporating the imaging optical device, such as a digital camera or a surveillance camera.

BACKGROUND ART

In recent years, along with improvements in performance and size reduction of image pickup devices, digital apparatuses with an image input function each including an imaging optical device, such as a mobile phone and a portable information terminal, have been coming into widespread use. This has led to a demand that an imaging lens system incorporated in an imaging optical device also be further improved in performance and size reduction and have an increased angle of view. Since it is not easy to eliminate various types of aberration over a wide angle of view, however, the more an angle of view is increased, the more difficult it becomes to correct aberration of an imaging lens system. Meanwhile, among various types of aberration, curvature of field occurs due to a deviation between an imaging flat surface and an image surface, and, therefore, by setting an imaging surface to have the same shape as that of an image surface, it is possible to reduce a burden of correcting this type of aberration on a lens system. From this standpoint, for the purpose of reducing curvature of field, each of Patent Documents 1 and 2 proposes a solid-state image pickup device having a curved imaging surface.

LIST OF CITATIONS

Patent Literature

Patent Document 1: JP-A-2004-104259
Patent Document 2: JP-A-2008-159823

SUMMARY OF THE INVENTION

Technical Problem

The mere use of the solid-state image pickup device described in each of Patent Documents 1 and 2, however, is not sufficient to obtain optical performance required of a wide angle lens system and can hardly allow the curvature of the imaging surface to be effectively utilized to achieve improvements in performance and size reduction and an increase in angle of view of the wide angle lens system.

The present invention has been made in view of the above-described problem and has as its object to provide a wide angle lens system that effectively utilizes the curvature of an imaging surface to achieve improvements in performance and size reduction and an increase in angle of view, as well as an imaging optical device and a digital apparatus that include the same.

Solution to the Problem

In order to achieve the above-described object, according to a first aspect of the invention, a wide angle lens system is a wide angle lens system that forms an image on an image pickup device having a curved imaging surface, has a total angle of view of not less than 120°, and is composed of, in order from an object side, a first lens element that is a meniscus lens element convex to the object side and has at least one aspherical surface, a second lens element that has at least one aspherical surface and has a positive optical power, and a third lens element that has at least one aspherical surface and is concave to an image surface side.

According to a second aspect of the invention, in the wide angle lens system according to the first aspect of the invention described above, a conditional formula (1) or (2) below is satisfied:

$$f3/f < -0.2 \quad (1)$$

$$f3/f > 1.0 \quad (2)$$

where
f3 represents a focal length of the third lens element, and
f represents a focal length of the entire lens system.

According to a third aspect of the invention, in the wide angle lens system according to the first or second aspect of the invention described above, a conditional formula (3) or (4) below is satisfied:

$$f1/f23 < -1.5 \quad (3)$$

$$f1/f23 > 8.0 \quad (4)$$

where
f1 represents a focal length of the first lens element, and
f23 represents a composite focal length of the second lens element and the third lens element.

According to a fourth aspect of the invention, in the wide angle lens system according to any one of the first to third aspects of the invention described above, the second lens element is a cemented lens element formed by cementing different materials together.

According to a fifth aspect of the invention, in the wide angle lens system according to any one of the first to fourth aspects of the invention described above, a conditional formula (5) below is satisfied:

$$0.09 < \sqrt{((BF^2 Y'^2)/Ri^2)} < 1.1 \quad (5)$$

where
BF represents a back focus,
Y' represents a maximum image height (a distance from an optical axis), and
Ri represents a radius of curvature of the imaging surface.

According to a sixth aspect of the invention, in the wide angle lens system according to any one of the first to fifth aspects of the invention described above, an aperture stop is located in the second lens element.

According to a seventh aspect of the invention, an imaging optical device includes the wide angle lens system according to any one of the first to sixth aspects of the invention described above, and an image pickup device that converts an optical image formed on the curved imaging surface into an electric signal. In the imaging optical device, the wide angle lens system is provided such that an optical image of a subject is formed on the imaging surface of the image pickup device.

According to an eighth aspect of the invention, a digital apparatus includes the imaging optical device according to the seventh aspect of the invention described above, whereby at least one of functions of still image photographing and moving image photographing of a subject is added to the digital apparatus.

According to a ninth aspect of the invention, the digital apparatus according to the eighth aspect of the invention described above is a surveillance camera, a digital camera, or a portable terminal with an image input function.

Advantageous Effects of the Invention

By adopting the configuration of the present invention, it is possible to realize a wide angle lens system that effectively utilizes the curvature of an imaging surface to achieve improvements in performance and size reduction and an increase in angle of view, and an imaging optical device including the same. By using the imaging optical device according to the present invention in a digital apparatus such as a digital camera, a mobile phone, or a portable information terminal, it becomes possible to compactly add a high-performance image input function to the digital apparatus.

BRIEF DESCRIPTION OF DRAWINGS

FIGS. 8A to 8C are aberration diagrams of Example 1.
FIGS. 9A to 9C are aberration diagrams of Example 2.
FIGS. 10A to 10C are aberration diagrams of Example 3.
FIGS. 11A to 11C are aberration diagrams of Example 4.
FIGS. 12A to 12C are aberration diagrams of Example 5.
FIGS. 13A to 13C are aberration diagrams of Example 6.
FIGS. 14A to 14C are aberration diagrams of Example 7.

DESCRIPTION OF EMBODIMENTS

Figure 1:
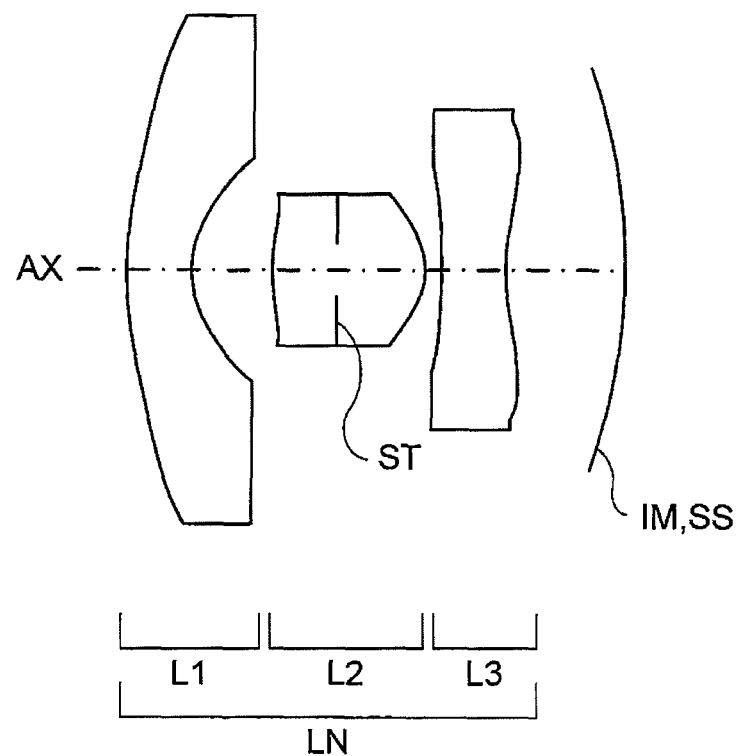
FIG. 1 is a lens configuration diagram of a first embodiment (Example 1).
Figure 2:
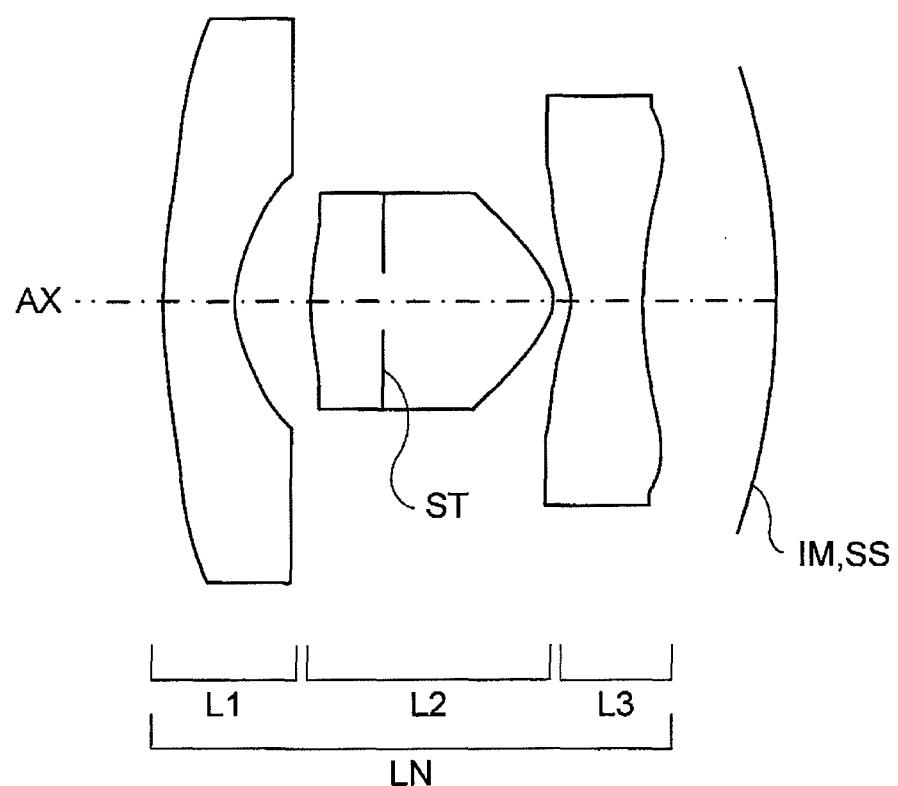
FIG. 2 is a lens configuration diagram of a second embodiment (Example 2).
Figure 3:
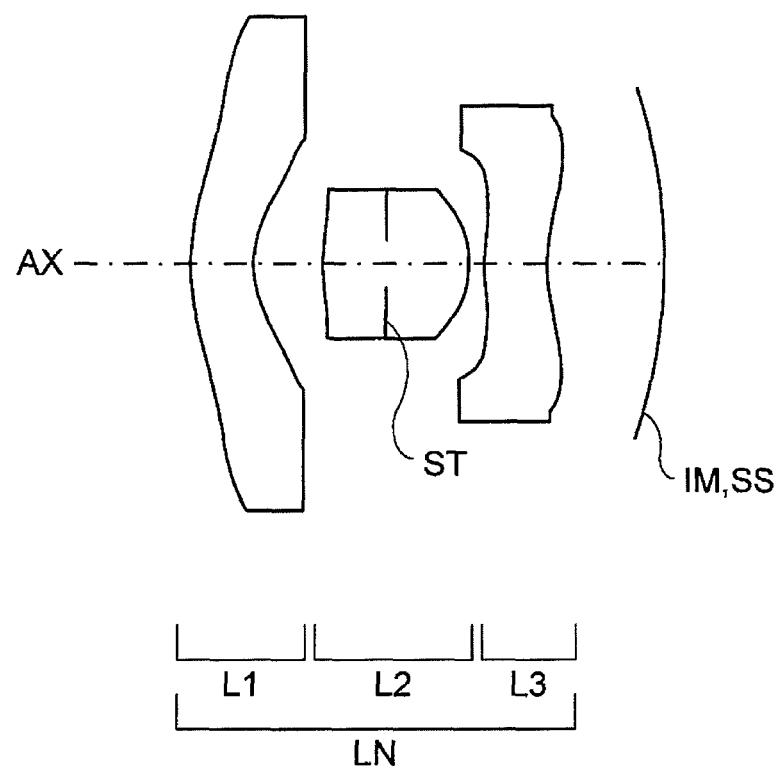
FIG. 3 is a lens configuration diagram of a third embodiment (Example 3).
Figure 4:
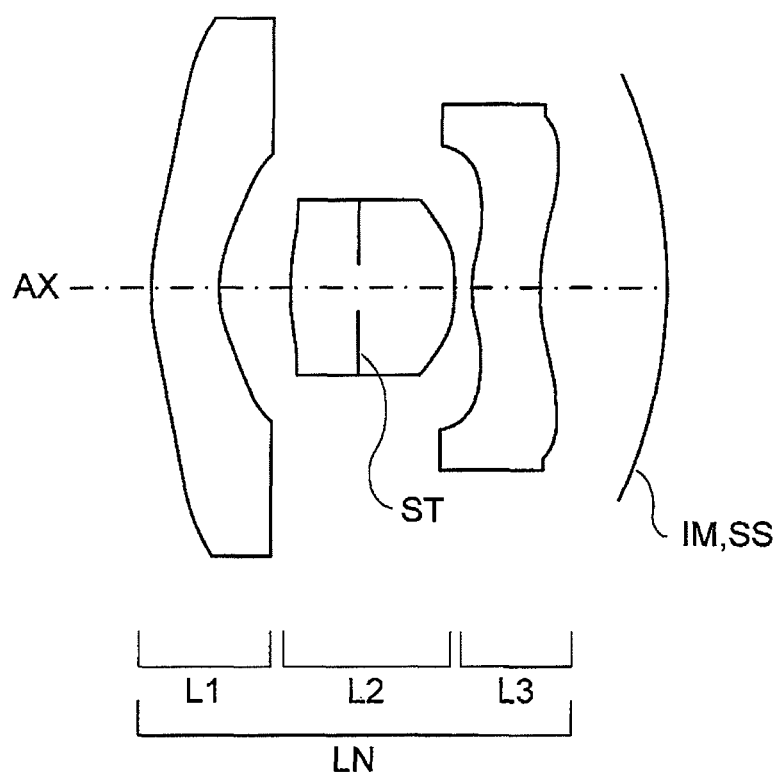
FIG. 4 is a lens configuration diagram of a fourth embodiment (Example 4).
Figure 5:
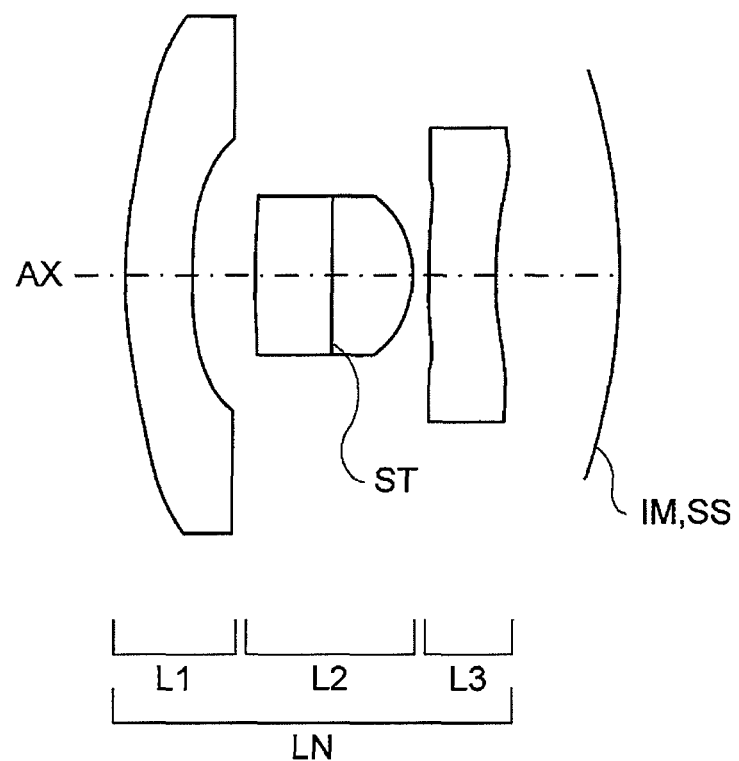
FIG. 5 is a lens configuration diagram of a fifth embodiment (Example 5).

The following describes a wide angle lens system, an imaging optical device, and a digital apparatus according to the present invention, and so on. The wide angle lens system according to the present invention is a wide angle lens system that forms an image on an image pickup device having a curved imaging surface. The wide angle lens system has a total angle of view of not less than 120° and is composed of, in order from an object side, a first lens element, a second lens element, and a third lens element. The first lens element is a meniscus lens element convex to the object side and has at least one aspherical surface. The second lens element has a positive optical power (an optical power is a quantity defined as a reciprocal of a focal length) and has at least one aspherical surface. The third lens element has at least one aspherical surface and is configured to be concave to an image surface side.

Through the use of a curved imaging surface, compared with a case of using a flat surface-shaped imaging surface, it becomes possible to allow a wide angle lens system to be improved in size reduction and performance, and thus there can be obtained a less costly and compact super wide angle lens system that has excellent optical performance and is suitable for use particularly in a digital input apparatus such as a surveillance camera. A wide angle lens system suitable for use with such a curved imaging surface can be realized by adopting the above-described configuration. For example, by the first lens element being a meniscus lens element convex to the object side, a wide angle of view can be handled, and by the first lens element having at least one aspherical surface, distortion aberration can be controlled. By the second lens element having at least one aspherical surface, spherical aberration and curvature of field can be reduced.

Furthermore, by the third lens element being configured to be concave to the image surface side, lateral chromatic aberration can be reduced, and by the third lens element having at least one aspherical surface, curvature of field can be reduced. With the third lens element configured to be concave to the image surface side, a ray of light is refracted, in a plane including an optical axis, in a direction away from the optical axis, thus being able to be bounced up, so that lateral chromatic aberration can be reduced. In a case of a conventional image pickup device having a flat surface-shaped imaging surface, an incidence angle of light that becomes incident on the image pickup device increases with increasing proximity to a peripheral portion thereof, which causes a failure that a resulting image is dimmed at its periphery. On the other hand, in the present invention, since the imaging surface is a concave surface, an incidence angle of light that becomes incident on the image pickup device does not increase so much even at a peripheral portion thereof, which is advantageous in that no dimming occurs in a resulting image. Although, since aberration results from a balance among conditions of a lens system as a whole, it is not necessarily appropriate to define a relationship between aberration correction and an aspherical shape, an aspherical surface (particularly, on an image side) of the first lens element is effective in correcting distortion aberration and curvature of field, and an aspherical surface of each of the second lens element and the third lens element is effective in correcting spherical aberration and curvature of field.

According to the above-described characteristic configuration, it is possible to realize a wide angle lens system that effectively utilizes the curvature of an imaging surface to achieve improvements in performance and size reduction and an increase in angle of view, and an imaging optical device including the same. By using the imaging optical device in a digital apparatus such as a digital camera, a mobile phone, or a portable information terminal, it becomes possible to compactly add a high-performance image input function to the digital apparatus, thus being able to contribute to improvements such as in compactness, cost reduction, performance, and functionality of the digital apparatus. The following describes conditions and so on for obtaining these effects in good balance and for achieving further improvements in optical performance, size reduction, and so on.

It is desirable to satisfy a conditional formula (1) or (2) below:

$$f3/f < -0.2 \quad (1)$$

$$f3/f > 1.0 \quad (2)$$

where
f3 represents a focal length of the third lens element, and
f represents a focal length of the entire lens system.

The conditional formulae (1) and (2) define a conditional range preferable in achieving a balance between a lens back and optical performance. If an upper limit of the conditional formula (1) is exceeded, the tendency is that a lens back becomes longer to increase the size of the lens system, and that curvature of field is deteriorated. Furthermore, if a lower limit of conditional formula (2) is fallen below, the tendency is that it becomes difficult to secure a lens back, and that lateral chromatic aberration is deteriorated.

It is desirable to satisfy a conditional formula (3) or (4) below:

$$f1/f23 < -1.5 \quad (3)$$

$$f1/f23 > 8.0 \quad (4)$$

where
f1 represents a focal length of the first lens element, and
f23 represents a composite focal length of the second lens element and the third lens element.

The conditional formulae (3) and (4) define a conditional range preferable in achieving a balance between the size of an optical system and optical performance. If an upper limit of the conditional formula (3) is exceeded, the tendency is that a lens back becomes longer to increase the size of the lens system, and that curvature of field is increased. Furthermore, if a lower limit of the conditional formula (4) is fallen below, there are caused a deterioration in lateral chromatic aberration and an increase in distortion aberration.

It is desirable to satisfy a conditional formula (5) below:

$$0.09 < \sqrt{((BF^2 + Y'^2)/Ri^2)} < 1.1 \quad (5)$$

where
BF represents a back focus,
Y' represents a maximum image height (a distance from an optical axis), and
Ri represents a radius of curvature of the imaging surface.

If a lower limit of the conditional formula (5) is fallen below, a radius of curvature of the imaging surface becomes too large, so that the merit of forming the imaging surface in a curved shape is diminished. If an upper limit of the conditional formula (5) is exceeded, the radius of curvature of the imaging surface becomes too small, so that an image can hardly be formed on the curved imaging surface. Specifically, the higher an image height is with respect to the curved imaging surface, the farther a direction in which an image is formed is from the lens system.

It is desirable that the second lens element be a cemented lens element formed by cementing different materials together. With a cemented lens element used as the second lens element, there can be expected a further improvement in optical performance such as reduction in chromatic aberration. Furthermore, it is desirable that an aperture stop be located in the second lens element. With the aperture stop provided in the second lens element, there is achieved a balance in the numbers of surfaces in front of and behind the aperture stop, thus making it possible to reduce various types of aberration by using a small number of lens elements.

The wide angle lens system according to the present invention is suitable for use as a wide angle lens system for a digital apparatus with an image input function (for example, a portable terminal), and by combining the wide angle lens system with an image pickup device or the like, it is possible to constitute an imaging optical device that optically captures video of a subject and outputs the video in the form of an electric signal. The imaging optical device is an optical device that is a main constituent component of a camera used for still image photographing and/or moving image photographing of a subject, and is configured by including, for example, in order from an object (namely, a subject) side, a wide angle lens system that forms an optical image of an object and an image pickup device that converts an optical image formed by the wide angle lens system into an electric signal. The wide angle lens system having the above-described characteristic configuration is disposed such that an optical image of a subject is formed on a light receiving surface (namely, an imaging surface) of the image pickup device, and thus it is possible to realize a compact and less costly imaging optical device that has high performance and a digital apparatus (for example, a portable terminal) including the same.

As examples of a camera, there are a digital camera, a video camera, a surveillance camera, an on-vehicle camera, a videophone camera, an endoscope, and so on, and there are also cameras of a type that is built in or externally connected to a personal computer, a digital apparatus (for example, a compact and portable information apparatus terminal such as a mobile phone or a mobile computer), a peripheral apparatus thereof (a scanner, a printer, or the like), any other type of digital apparatus, or the like. As can be understood from these examples, by using the imaging optical device, it is possible to constitute a camera, and in addition, by incorporating the imaging optical device in various types of apparatuses, a camera function can be added to those apparatuses. For example, it is possible to constitute a digital apparatus with an image input function such as a camera-equipped mobile phone.

Figure 15:
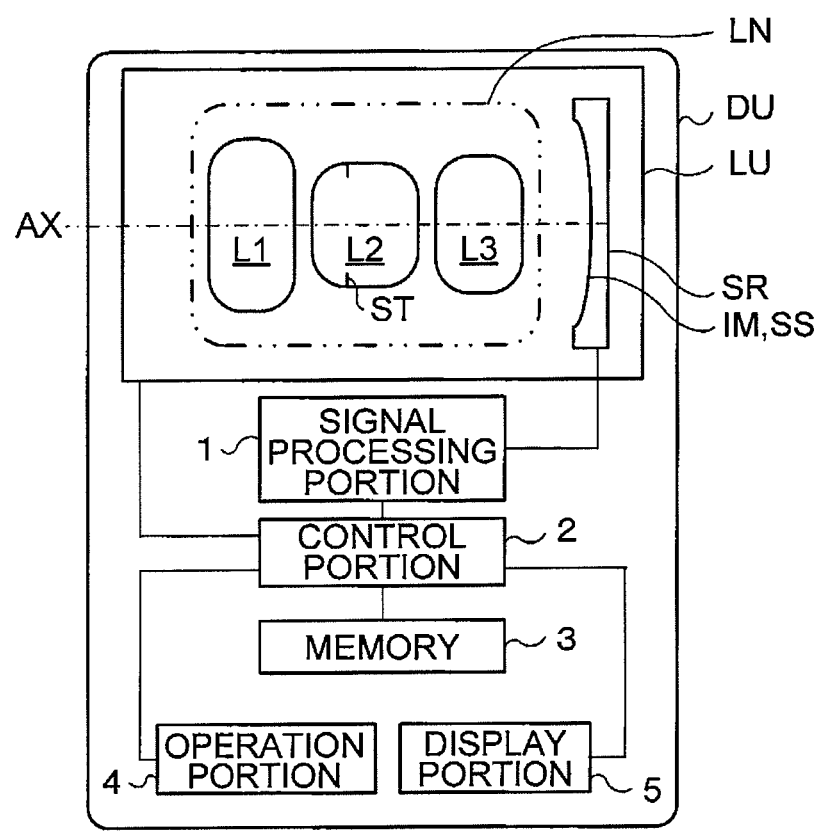
FIG. 15 is a schematic view showing a diagrammatic configuration example of a digital apparatus incorporating an imaging optical device.

FIG. 15 shows, in schematic section, a diagrammatic configuration example of a digital apparatus DU as one example of a digital apparatus with an image input function. An imaging optical device LU incorporated in the digital apparatus DU shown in FIG. 15 includes, in order from an object (namely, a subject) side, a wide angle lens system LN (AX denotes an optical axis) that forms an optical image (image surface) IM of an object and an image pickup device SR that converts the optical image IM formed on an imaging surface (light receiving surface) SS by the wide angle lens system LN into an electric signal. While in a case where the digital apparatus DU with an image input function is constituted by using the imaging optical device LU, typically, the imaging optical device LU is disposed in a body of the digital apparatus DU, any form required to realize a camera function can be adopted. For example, a configuration is possible in which the imaging optical device LU is formed as a unit so that it is mountable to/demountable from a main body of the digital apparatus DU or pivotable with respect thereto.

As the image pickup device SR, for example, a solid-state image pickup device having a plurality of pixels, such as a CCD type image sensor or a CMOS type image sensor, is used. The wide angle lens system LN is provided such that the optical image IM of a subject is formed on the imaging surface SS, which is a photoelectric conversion area of the image pickup device SR, and the optical image IM formed by the wide angle lens system LN, therefore, is converted into an electric signal by the image pickup device SR.

The digital apparatus DU includes, in addition to the imaging optical device LU, a signal processing portion 1, a control portion 2, a memory 3, an operation portion 4, a display portion 5, and so on. At the signal processing portion 1, a signal generated at the image pickup device SR is subjected to predetermined digital image processing, image compression processing, or the like as required. Then, the signal is recorded as a digital video signal in the memory 3 (a semiconductor memory, an optical disc, or the like). Alternatively, in some cases, the signal is transmitted to another apparatus via a cable or after being converted into an infrared signal or the like (for example, a communication function of a mobile phone). The control portion 2 is constituted by a microcomputer and performs, in a concentrated fashion, control of functions such as a photographing function (a still image photographing function, a moving image photographing function, and so on) and an image reproducing function, control of a lens moving mechanism for focusing, and so on. For example, by the control portion 2, the imaging optical device LU is controlled to perform at least one of still image photographing and moving image photographing of a subject. The display portion 5 is a portion including a display such as a liquid crystal monitor and performs image display by using an image signal obtained through conversion by the image pickup device SR or image information recorded in the memory 3. The operation portion 4 is a portion including an operation member such as an operation button (for example, a release button) or an operation dial (for example, a photographing mode dial) and transmits to the control portion 2 information inputted through an operation by an operator.

The imaging lens system LN is composed of, in order from the object side, a first lens element L1 that is a meniscus lens element convex to the object side, a second lens element L2 having a positive optical power, and a third lens element L3 concave to an image surface side, and each of the first to third lens elements L1 to L3 has at least one aspherical surface. By the imaging lens system LN, the optical image IM is formed on the imaging surface SS of the image pickup device SR. Herein, by way of first to fifth embodiments, a specific optical configuration of the wide angle lens system LN is described in greater detail. FIGS. 1 to 5 show, in optical section, the first to fifth embodiments of the wide angle lens system LN (fixed focal length lens).

A wide angle lens system LN of the first embodiment (FIG. 1) is composed of, in order from an object side, a first lens element L1, a second lens element L2, and a third lens element L3, and lens surfaces thereof are all aspherical. When these lens elements are seen in terms of their paraxial surface shapes, the first lens element L1 is a negative meniscus lens element convex to the object side, the second lens element L2 is a biconvex positive lens element having an aperture stop ST therein, and the third lens element L3 is a biconcave negative lens element.

A wide angle lens system LN of the second embodiment (FIG. 2) is composed of, in order from an object side, a first lens element L1, a second lens element L2, and a third lens element L3, and lens surfaces thereof are all aspherical. When these lens elements are seen in terms of their paraxial surface shapes, the first lens element L1 is a negative meniscus lens element convex to the object side, the second lens element L2 is a biconvex positive lens element having an aperture stop ST therein, and the third lens element L3 is a biconcave negative lens element.

A wide angle lens system LN of the third embodiment (FIG. 3) is composed of, in order from an object side, a first lens element L1, a second lens element L2, and a third lens element L3, and lens surfaces thereof are all aspherical. When these lens elements are seen in terms of their paraxial surface shapes, the first lens element L1 is a negative meniscus lens element convex to the object side, the second lens element L2 is a biconvex positive lens element having an aperture stop ST therein, and the third lens element L3 is a negative meniscus lens element concave to an image side.

A wide angle lens system LN of the fourth embodiment (FIG. 4) is composed of, in order from an object side, a first lens element L1, a second lens element L2, and a third lens element L3, and lens surfaces thereof are all aspherical. When these lens elements are seen in terms of their paraxial surface shapes, the first lens element L1 is a negative meniscus lens element convex to the object side, the second lens element L2 is a biconvex positive lens element having an aperture stop ST therein, and the third lens element L3 is a positive meniscus lens element convex to the object side.

A wide angle lens system LN of the fifth embodiment (FIG. 5) is composed of, in order from an object side, a first lens element L1, a second lens element L2, and a third lens element L3, and lens surfaces thereof are all aspherical. When these lens elements are seen in terms of their paraxial surface shapes, the first lens element L1 is a positive meniscus lens element convex to the object side, the second lens element L2 is a positive meniscus lens element convex to an image side and having an aperture stop ST at a cemented surface thereof, and the third lens element L3 is a biconcave negative lens element.

Figure 6:
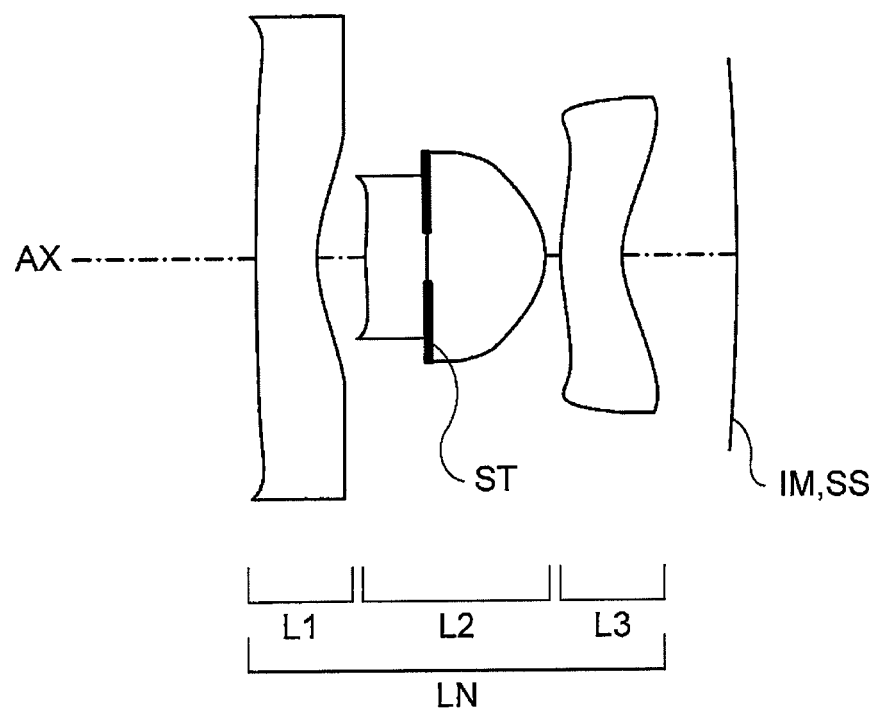
FIG. 6 is a lens configuration diagram of a sixth embodiment (Example 6).

A wide angle lens system LN of the sixth embodiment (FIG. 6) is composed of, in order from an object side, a first lens element L1, a second lens element L2, and a third lens element L3, and lens surfaces thereof are all aspherical. When these lens elements are seen in terms of their paraxial surface shapes, the first lens element L1 is a negative meniscus lens element convex to the object side, the second lens element L2 is a biconvex positive lens element and having an aperture stop ST at a cemented surface thereof, and the third lens element L3 is a negative meniscus lens element convex to the object side.

Figure 7:
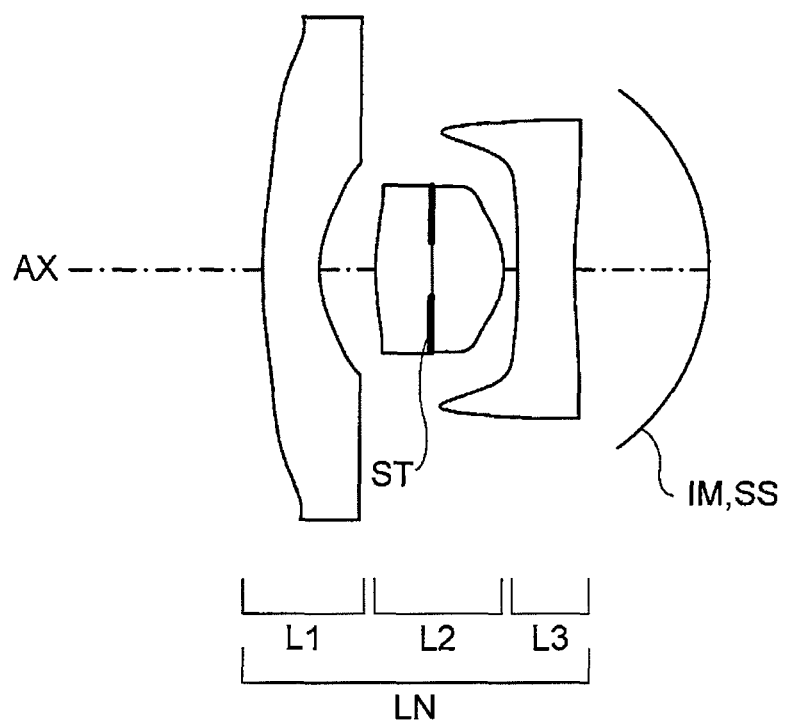
FIG. 7 is a lens configuration diagram of a seventh embodiment (Example 7).

A wide angle lens system LN of the seventh embodiment (FIG. 7) is composed of, in order from an object side, a first lens element L1, a second lens element L2, and a third lens element L3, and lens surfaces thereof are all aspherical. When these lens elements are seen in terms of their paraxial surface shapes, the first lens element L1 is a negative meniscus lens element convex to the object side, the second lens element L2 is a biconvex positive lens element and having an aperture stop ST at a cemented surface thereof, and the third lens element L3 is a negative meniscus lens element convex to the object side.

EXAMPLES

By way of construction data and so on of examples, the following more specifically describes a configuration and so on of a wide angle lens system to which the present invention is applied. Examples 1 to 7 (EX1 to EX7) described herein are numerical examples corresponding to the above-described first to seventh embodiments, respectively, and each of optical configuration diagrams (FIGS. 1 to 7) illustrating the first to seventh embodiments shows a corresponding one of lens configurations of Examples 1 to 7.

In the construction data of the examples, as surface data, there are shown, in order from a left side column, a surface number i, a radius of curvature r (mm), a surface interval d (mm) on an axis, a refractive index nd with respect to the d-line (a wavelength of 587.56 nm), and an Abbe number vd with respect to the d-line. A surface whose surface number i is accompanied by "(ASP)" is an aspherical surface, and a surface shape thereof is defined by a formula (AS) below, which uses a local rectangular coordinate system (x, y, z) having an origin at a surface vertex. As aspherical surface data, an aspherical surface coefficient and so on are shown. Note that, in the aspherical surface data of the examples, the coefficient of an unlisted term is zero, and $E-n=\times 10^{-n}$ applies to all the data.

$$z=(c\cdot h^2)/[1+\sqrt{\{1-(1+K)\cdot c^2\cdot h^2\}}]+\Sigma(Aj\cdot h^j) \quad (AS)$$

where h represents a height in a direction perpendicular to a z axis (optical axis AX) ($h^2=x^2+y^2$), z represents a sag amount (relative to a surface vertex) at a position of the height h in a direction of the optical axis AX, c represents a curvature (a reciprocal of the radius of curvature r) at a surface vertex, K represents a conic constant, and Aj represents an aspherical surface coefficient of a j-th order.

Figure 16:
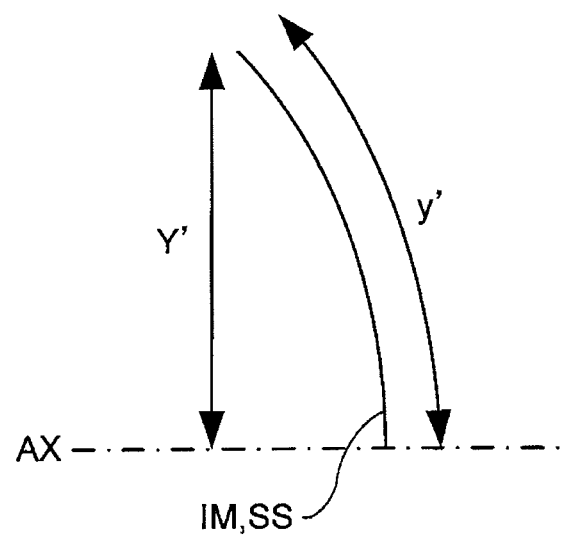
FIG. 16 is a diagram showing a relationship between an image height Y' and an image height y'.

As various data, there are shown a focal length (f (mm)) of the entire system, an F number (Fno.), a half angle of view (ω(°)), a maximum image height (Y' (mm)), an image height (y' (mm), see FIG. 16) along an R surface of the imaging surface SS, a total lens length (TL (mm)), and a back focus (BF (mm)), and as lens element data, there are shown respective focal lengths f1, f2, and f3 of the first lens element L1, the second lens element L2, and the third lens element L3. Furthermore, Table 1 shows values corresponding to the conditional formulae, respectively, of the examples. The back focus is given as a distance (paraxial) from a rearmost surface of the lens system to a paraxial image surface in terms of an air conversion length, and the total lens length is determined by adding the back focus to a distance (paraxial) from a foremost surface of the lens system to the rearmost surface of the lens system.

FIGS. 8A-8C to 14A-14C are aberration diagrams of Examples 1 to 7 (EX1 to EX7) in a case where an object is at an infinite distance (object distance: ∞). In FIGS. 8A-8C to FIGS. 14A-14C, FIGS. 8A to 14A are spherical aberration diagrams, FIGS. 8B to 14B are astigmatism diagrams, and FIGS. 8C to 14C are distortion aberration diagrams. In the spherical aberration diagrams, a solid line indicates a spherical aberration amount with respect to the d-line (a wavelength of 587.56 nm), an alternate long and short dashed line indicates a spherical aberration amount with respect to the C-line (a wavelength of 656.27 nm), and a broken line indicates a spherical aberration amount with respect to the g-line (a wavelength of 435.83 nm), each given as a deviation amount (unit: mm) from a paraxial image surface in the direction of the optical axis AX, with the vertical axis indicating a value obtained by normalizing a height of incidence on a pupil with a maximum height thereof (namely, a relative pupil height).

In the astigmatism diagrams, a broken line T indicates a tangential image surface with respect to the d-line, and a solid line S indicates a sagittal image surface with respect to the d-line, each given as a deviation amount (unit: mm) from a paraxial image surface in the direction of the optical axis AX, with the vertical axis indicating an image height (IMG HT (unit: mm)). A rearmost R surface in each of FIGS. 1 to 7 is indicative that the imaging surface SS (image forming position IM) has a curved shape, and with respect to a curve of the curved shape, the aberration diagrams 8B to 14B showing curvature of field are drawn. That is, in the aberration diagrams 8B to 14B, the vertical axis represents by its line the imaging surface SS (curved surface). In the distortion aberration diagrams, the horizontal axis indicates a distortion (unit: %) with respect to the d-line, and the vertical axis indicates an image height (IMG HT (unit: mm)). A maximum value of the image height IMG HT equates to the maximum image height Y' on the image surface IM (one-half of a diagonal length of the imaging surface SS of the image pickup device SR).

EXAMPLE 1 unit: mm

Surface Data

| i | r | d | nd | vd |
|---|---|---|---|---|
| 1(ASP) | 4.8058 | 0.8000 | 1.53048 | 55.7 |
| 2(ASP) | 1.3000 | 1.0015 | | |
| 3(ASP) | 2.3852 | 0.8000 | 1.53048 | 55.7 |
| 4(stop) | ∞ | 1.0918 | 1.53048 | 55.7 |
| 5(ASP) | −0.8636 | 0.2000 | | |
| 6(ASP) | −12.9751 | 0.8000 | 1.63200 | 23.4 |
| 7(ASP) | 2.4223 | 1.4530 | | |
| 8(image surface) | −7.4069 | | | |

Aspherical Surface Data

First Surface

K = −0.25796
A4 = −0.00576
A6 = −0.0012
A8 = 0.000264
A10 = −1.37E−05
A12 = 8.96E−08

Second Surface

K = −0.47418
A4 = 0.050212
A6 = −0.12986
A8 = 0.067469
A10 = −0.01591
A12 = 1.69E−03

Third Surface

K = −0.24297
A4 = −0.16797
A6 = 0.089188
A8 = −0.09329
A10 = 0.002945
A12 = 3.24E−12

Fifth Surface

K = −3.30019
A4 = −0.25941
A6 = −0.09566
A8 = 0.661748
A10 = −0.41825
A12 = 1.87E−11

Sixth Surface

K = −30
A4 = 0.024971
A6 = −0.13365
A8 = 0.132045 unit: mm

A10 = −0.04418
A12 = 2.02E−03
Seventh Surface

K = −17.605
A4 = 0.000682
A6 = −0.0199
A8 = 0.008264
A10 = −0.00145
A12 = 5.59E−05

Various Data

| f | 1.986 |
| Fno. | 4.0 |
| ω | 85 |
| Y' | 2.455 |
| y' | 2.503 |
| TL | 6.146 |
| BF | 1.453 |

Lens Element Data

| f1 | −3.648 |
| f2 | 1.497 |
| f3 | −3.166 |
| f23 | 1.766 |

EXAMPLE 2 unit: mm

Surface Data

| i | r | d | nd | vd |
|---|---|---|---|---|
| 1(ASP) | 6.1841 | 0.8000 | 1.53048 | 55.7 |
| 2(ASP) | 1.3000 | 0.8543 | | |
| 3(ASP) | 3.1221 | 0.8000 | 1.53048 | 55.7 |
| 4(stop) | ∞ | 1.8940 | 1.53048 | 55.7 |
| 5(ASP) | −0.3577 | 0.2000 | | |
| 6(ASP) | −0.4501 | 0.8000 | 1.63200 | 23.4 |
| 7(ASP) | 5.4937 | 1.5000 | | |
| 8(image surface) | −8.3306 | | | |

Aspherical Surface Data

First Surface

K = −2.37474
A4 = −0.00577
A6 = −0.00123
A8 = 0.000301
A10 = −1.23E−05
A12 = −2.12E−07
Second Surface K = −0.64061
A4 = −0.07287
A6 = −0.0518
A8 = 0.043297
A10 = −0.00881
A12 = 7.86E−04
Third Surface K = 4.235883
A4 = −0.11207
A6 = 0.055411
A8 = 0.024393
A10 = −0.03602
A12 = −2.99E−02 unit: mm

Fifth Surface

K = −3.07936
A4 = −0.24704
A6 = −0.00595
A8 = 0.350232
A10 = −0.31983
A12 = 9.05E−02
Sixth Surface K = −10.1558
A4 = 0.208573
A6 = −0.21939
A8 = 0.125986
A10 = −0.03776
A12 = 4.38E−03
Seventh Surface K = 2.661032
A4 = 0.027001
A6 = −0.02896
A8 = 0.009531
A10 = −0.00155
A12 = 8.07E−05

Various Data

| f | 2.086 |
| Fno. | 4.0 |
| ω | 85 |
| Y' | 2.502 |
| y' | 2.541 |
| TL | 6.848 |
| BF | 1.5 |

Lens Element Data

| f1 | −3.290 |
| f2 | 0.827 |
| f3 | −0.626 |
| f23 | 1.838 |

EXAMPLE 3 unit: mm

Surface Data

| i | r | d | nd | vd |
|---|---|---|---|---|
| 1(ASP) | 2.9743 | 0.8000 | 1.53048 | 55.7 |
| 2(ASP) | 1.3090 | 0.8918 | | |
| 3(ASP) | 2.8298 | 0.8000 | 1.53048 | 55.7 |
| 4(stop) | ∞ | 1.0391 | 1.53048 | 55.7 |
| 5(ASP) | −1.4752 | 0.2000 | | |
| 6(ASP) | 2.5485 | 0.8000 | 1.63200 | 23.4 |
| 7(ASP) | 2.2141 | 1.4999 | | |
| 8(image surface) | −7.1440 | | | |

Aspherical Surface Data

First Surface

K = −3.48666
A4 = −0.01033
A6 = −0.0009
A8 = 0.00029
A10 = −1.41E−05
A12 = 3.82E−08
Second Surface

K = −0.64063
A4 = −0.02123
A6 = −0.09567

-continued unit: mm

A8 = 0.064153
A10 = −0.02325
A12 = 3.66E-03
Third Surface

K = 1.454033
A4 = −0.12575
A6 = −0.06248
A8 = 0.105835
A10 = −0.05905
A12 = −1.35E-10
Fifth Surface K = −1.55905
A4 = −0.30333
A6 = −0.05131
A8 = 0.640072
A10 = −0.4416
A12 = 1.73E-10
Sixth Surface K = −25.4191
A4 = −0.11908
A6 = −0.05718
A8 = 0.119009
A10 = −0.05171
A12 = 4.44E-03
Seventh Surface K = −4.56782
A4 = −0.04369
A6 = −0.00995
A8 = 0.00981
A10 = −0.00239
A12 = 1.43E-04

Various Data

| | |
|---|---|
| f | 2.241 |
| Fno. | 4.0 |
| ω | 85 |
| Y' | 2.5 |
| y' | 2.554 |
| TL | 6.031 |
| BF | 1.4999 |

Lens Element Data

| | |
|---|---|
| f1 | −5.288 |
| f2 | 2.146 |
| f3 | −362.765 |
| f23 | 1.889 |

EXAMPLE 4 unit: mm

Surface Data

| i | r | d | nd | vd |
|---|---|---|---|---|
| 1(ASP) | 2.7029 | 0.8000 | 1.53048 | 55.7 |
| 2(ASP) | 1.3000 | 0.8381 | | |
| 3(ASP) | 3.0477 | 0.8000 | 1.53048 | 55.7 |
| 4(stop) | ∞ | 1.1191 | 1.53048 | 55.7 |
| 5(ASP) | −10.0905 | 0.2000 | | |
| 6(ASP) | 1.1157 | 0.8000 | 1.63200 | 23.4 |
| 7(ASP) | 2.5697 | 1.4996 | | |
| 8(image surface) | −6.0000 | | | |

-continued unit: mm

Aspherical Surface Data

First Surface

K = −13.9419
A4 = −0.0024
A6 = −0.00099
A8 = 0.000266
A10 = −1.72E-05
A12 = 3.21E-07
Second Surface K = −0.83341
A4 = −0.11497
A6 = −0.0583
A8 = 0.083155
A10 = −0.03196
A12 = 4.50E-03
Third Surface K = 2.898637
A4 = −0.08031
A6 = −0.09174
A8 = 0.343568
A10 = −0.3077
A12 = −5.43E-08
Fifth Surface K = −10.8189
A4 = −1.00824
A6 = 1.112719
A8 = −0.46846
A10 = 0.035767
A12 = −4.63E-09
Sixth Surface K = −8.5851
A4 = −0.16071
A6 = −0.03623
A8 = 0.085141
A10 = −0.02716
A12 = 1.21E-03
Seventh Surface K = −0.0394
A4 = −0.02758
A6 = −0.03682
A8 = 0.017381
A10 = −0.00307
A12 = 1.51E-04

Various Data

| | |
|---|---|
| f | 2.143 |
| Fno. | 4.0 |
| ω | 85 |
| Y' | 2.497 |
| y' | 2.575 |
| TL | 6.057 |
| BF | 1.4996 |

Lens Element Data

| | |
|---|---|
| f1 | −5.885 |
| f2 | 4.648 |
| f3 | 2.572 |
| f23 | 1.893 |

EXAMPLE 5 unit: mm

Surface Data

| i | r | d | nd | vd |
|---|---|---|---|---|
| 1(ASP) | 5.8638 | 0.8122 | 1.563907 | 42.9 |
| 2(ASP) | 9.7458 | 0.7683 | | |
| 3(ASP) | −79.0898 | 0.9410 | 1.63200 | 23.4 |
| 4(stop) | 1.00E+18 | 0.9983 | 1.53048 | 55.7 |
| 5(ASP) | −1.1172 | 0.2000 | | |
| 6(ASP) | −36.5727 | 0.8000 | 1.63200 | 23.4 |
| 7(ASP) | 6.6137 | 1.4998 | | |
| 8(image surface) | −8.0000 | | | |

Aspherical Surface Data

First Surface

K = 1.169764
A4 = −0.00355
A6 = −0.00155
A8 = 0.000273
A10 = −1.17E−05
A12 = 4.44E−10

Second Surface

K = 11.05146
A4 = 0.061645
A6 = −0.02671
A8 = 0.017441
A10 = −0.00644
A12 = 1.00E−03

Third Surface

K = −30
A4 = 0.297086
A6 = −0.61804
A8 = 0.591081
A10 = −0.25029
A12 = −2.11E−03

Fifth Surface

K = −17.7084
A4 = −0.48344
A6 = 0.207365
A8 = 0.600891
A10 = −1.37669
A12 = 7.29E−01

Sixth Surface

K = −17.4896
A4 = 0.253486
A6 = −0.3667
A8 = 0.176832
A10 = 0.019771
A12 = −3.58E−02

Seventh Surface

K = 12.82631
A4 = 0.051465
A6 = −0.05884
A8 = 0.020452
A10 = −0.00344
A12 = 4.61E−05

Various Data

| | |
|---|---|
| f | 2.619 |
| Fno. | 4.0 |
| ω | 85 |
| Y' | 2.5 |
| y' | 2.543 |
| TL | 6.02 |
| BF | 1.4998 | unit: mm

Lens Element Data

| | |
|---|---|
| f1 | 24.275 |
| f2 | 2.121 |
| f3 | −8.799 |
| f23 | 2.567 |

EXAMPLE 6 unit: mm

Surface Data

| i | r | d | nd | vd |
|---|---|---|---|---|
| 1(ASP) | 29.809 | 0.800 | 1.53048 | 55.7 |
| 2(ASP) | 1.971 | 0.639 | | |
| 3(ASP) | 4.274 | 0.800 | 1.63200 | 23.4 |
| 4(stop) | ∞ | 1.561 | 1.53048 | 55.7 |
| 5(ASP) | −1.013 | 0.200 | | |
| 6(ASP) | 2.722 | 0.800 | 1.63200 | 23.4 |
| 7(ASP) | 1.276 | 1.500 | | |
| 8(image surface) | −31.309 | | | |

Aspherical Surface Data

First Surface

K = −21.8810
A4 = −8.0722E−04
A6 = −9.6168E−04
A8 = 2.8488E−04
A10 = −1.7882E−05
A12 = −2.8835E−07

Second Surface

K = −0.7330
A4 = −4.2166E−04
A6 = −1.1618E−01
A8 = 9.0150E−02
A10 = −2.9560E−02
A12 = 3.5666E−03

Third Surface

K = 11.4170
A4 = −1.8083E−01
A6 = 2.7486E−03
A8 = 6.4750E−02
A10 = −1.7373E−02
A12 = −7.9106E−02

Fifth Surface

K = −3.1340
A4 = −3.1408E−01
A6 = 3.8960E−01
A8 = −4.7998E−01
A10 = 3.8449E−01
A12 = −1.2006E−01

Sixth Surface

K = −29.7866
A4 = 4.4035E−02
A6 = −1.1134E−01
A8 = 8.5438E−02
A10 = −2.9855E−02
A12 = 3.7576E−03

Seventh Surface

K = −4.1415
A4 = −2.7543E−02
A6 = −3.7997E−03

-continued

| unit: mm |
|---|
| A8 = 5.6178E−03 |
| A10 = −1.6327E−03 |
| A12 = 1.3315E−04 |

| Various Data | |
|---|---|
| f | 2.044 |
| Fno. | 4.0 |
| ω | 85 |
| Y' | 2.5 |
| y' | 2.503 |
| TL | 6.300 |
| BF | 1.500 |

| Lens Element Data | |
|---|---|
| f1 | −4.018 |
| f2 | 1.804 |
| f3 | −4.836 |
| f23 | 1.814 |

EXAMPLE 7

| unit: mm | | | | |
|---|---|---|---|---|
| Surface Data | | | | |
| i | r | d | nd | vd |
| 1(ASP) | 6.361 | 0.800 | 1.53048 | 55.7 |
| 2(ASP) | 1.532 | 0.801 | | |
| 3(ASP) | 2.807 | 0.800 | 1.63200 | 23.4 |
| 4(stop) | ∞ | 1.010 | 1.53048 | 55.7 |
| 5(ASP) | −1.347 | 0.200 | | |
| 6(ASP) | 18.036 | 0.800 | 1.63200 | 23.4 |
| 7(ASP) | 7.000 | 1.889 | | |
| 8(image surface) | −3.0974 | | | |

| Aspherical Surface Data |
|---|
| First Surface |
| K = −13.3828 |
| A4 = −4.7049E−03 |
| A6 = −9.9189E−04 |
| A8 = 3.7935E−04 |
| A10 = −2.9296E−05 |
| A12 = 5.9658E−07 |

-continued

| unit: mm |
|---|
| Second Surface |
| K = −0.7959 |
| A4 = −9.8371E−03 |
| A6 = −9.5800E−02 |
| A8 = 7.1055E−02 |
| A10 = −2.2167E−02 |
| A12 = 3.3587E−03 |
| Third Surface |
| K = −5.8413 |
| A4 = −1.1438E−01 |
| A6 = 1.0963E−01 |
| A8 = −6.0567E−02 |
| A10 = 8.7072E−03 |
| A12 = 1.9061E−04 |
| Fifth Surface |
| K = −5.7076 |
| A4 = −4.3935E−01 |
| A6 = 4.4651E−01 |
| A8 = −3.7485E−01 |
| A10 = 5.2554E−01 |
| A12 = −2.7750E−01 |
| Sixth Surface |
| K = −30.0000 |
| A4 = −1.0454E−01 |
| A6 = −1.2268E−02 |
| A8 = 9.3500E−02 |
| A10 = −4.9946E−02 |
| A12 = 7.0097E−03 |
| Seventh Surface |
| K = −30.0000 |
| A4 = −1.2401E−02 |
| A6 = −5.5713E−03 |
| A8 = 4.0929E−03 |
| A10 = −5.8743E−04 |
| A12 = −1.9745E−05 |

| Various Data | |
|---|---|
| f | 2.350 |
| Fno. | 4.0 |
| ω | 85 |
| Y' | 2.5 |
| y' | 2.909 |
| TL | 6.300 |
| BF | 1.889 |

| Lens Element Data | |
|---|---|
| f1 | −4.036 |
| f2 | 1.934 |
| f3 | −18.624 |
| f23 | 1.978 |

TABLE 1

| Conditional Formula | EX 1 | EX 2 | EX 3 | EX 4 | EX 5 | EX 6 | EX 7 |
|---|---|---|---|---|---|---|---|
| (1) f3/f | −1.59 | −0.30 | −161.87 | — | −3.36 | −2.366 | −7.927 |
| (2) | — | — | — | 1.20 | — | — | — |
| (3) f1/f23 | −2.07 | −1.79 | −2.80 | −3.11 | — | −2.215 | −2.041 |
| (4) | — | — | — | — | 9.46 | — | — |
| (5) $\sqrt{((BF^2+Y'^2)/Ri^2)}$ | 0.385 | 0.350 | 0.408 | 0.485 | 0.364 | 0.093 | 1.012 |

LIST OF REFERENCE SYMBOLS

DU digital apparatus
LU imaging optical device
LN wide angle lens system
L1 to L3 first to third lenses elements
ST stop (aperture stop)
SR image pickup device
SS imaging surface (light receiving surface)
IM image surface (optical image)
AX optical axis
1 signal processing portion
2 control portion
3 memory
4 operation portion
5 display portion

The invention claimed is:

1. A wide angle lens system that forms an image on an image pickup device having a curved imaging surface and has a total angle of view of not less than 120°, comprising, in order from an object side:
   a first lens element that is a meniscus lens element convex to the object side and has at least one aspherical surface;
   a second lens element that has at least one aspherical surface and has a positive optical power; and
   a third lens element that has at least one aspherical surface and is concave to an image surface side,
   wherein one of the following conditional formulas is satisfied:

$f1/f23 < -1.5$; or $f1/f23 > 8.0$, where f1 represents a focal length of the first lens element, and f23 represents a composite focal length of the second lens element and the third lens element.

2. The wide angle lens system according to claim 1, wherein the second lens element is a cemented lens element formed by cementing different materials together.

3. The wide angle lens system according to claim 1, wherein the following conditional formula:

$0.09 < \sqrt{(BF^2 + Y'^2)/Ri^2} < 1.1$, where BF represents a back focus, Y' represents a maximum image height (a distance from an optical axis), and Ri represents a radius of curvature of the imaging surface.

4. The wide angle lens system according to claim 1, wherein an aperture stop is located in the second lens element.

5. An imaging optical device, comprising:
   the wide angle lens system according to claim 1; and
   an image pickup device that converts an optical image formed on the curved imaging surface into an electric signal,
   wherein the wide angle lens system is provided such that an optical image of a subject is formed on the imaging surface of the image pickup device.

6. A digital apparatus comprising the imaging optical device according to claim 5, wherein at least one of functions of still image photographing and moving image photographing of a subject is added to the digital apparatus.

7. The digital apparatus according to claim 6, wherein the digital apparatus is a surveillance camera, a digital camera, or a portable terminal with an image input function.

8. A wide angle lens system that forms an image on an image pickup device having a curved imaging surface and has a total angle of view of not less than 120°, comprising, in order from an object side:
   a first lens element that is a meniscus lens element convex to the object side and has at least one aspherical surface;
   a second lens element that has at least one aspherical surface and has a positive optical power; and
   a third lens element that has at least one aspherical surface and is concave to an image surface side,
   wherein the following conditional formula is satisfied:

$0.09 < \sqrt{(BF^2 + Y'^2)/Ri^2} < 1.1$, where BF represents a back focus, Y' represents a maximum image height (a distance from an optical axis), and Ri represents a radius of curvature of the imaging surface.

* * * * *